US012675423B2

(12) United States Patent
Lu et al.

(10) Patent No.: US 12,675,423 B2
(45) Date of Patent: Jul. 7, 2026

(54) UNBLOCK REQUEST

(71) Applicant: Arm Limited, Cambridge (GB)

(72) Inventors: Wenjin Lu, Austin, TX (US); David Frederick Greenberg, Austin, TX (US); Premkishore Shivakumar, Austin, TX (US); Daniel Frederick Stafford, Houston, TX (US); Rohit Pandharinath Pawar, Austin, TX (US); David Yue Williams, Austin, TX (US); David Allen Brown, Austin, TX (US)

(73) Assignee: Arm Limited, Cambridge (GB)

( * ) Notice: Subject to any disclaimer, the term of this patent is extended or adjusted under 35 U.S.C. 154(b) by 30 days.

(21) Appl. No.: 18/976,937

(22) Filed: Dec. 11, 2024

(65) Prior Publication Data

US 2026/0161581 A1     Jun. 11, 2026

(51) Int. Cl.
G06F 13/20          (2006.01)

(52) U.S. Cl.
CPC .......... G06F 13/20 (2013.01); G06F 2213/40 (2013.01)

(58) Field of Classification Search
CPC .............................. G06F 13/20; G06F 2213/40
See application file for complete search history.

(56) References Cited

U.S. PATENT DOCUMENTS 7,047,374 B2 *  5/2006  Sah ..................... G06F 12/0862
                                                      710/39
9,229,896 B2 *  1/2016  Balkan ................ G06F 13/4027
2008/0071997 A1 *  3/2008  Loaiza .................... G06F 9/526
                                                      710/200

OTHER PUBLICATIONS

Arm, Arm CoreLink NI-700 Network-on-Chip Interconnect, Technical Reference Manual, Issue 10, 399 pages., 2019-2021, 2023.

* cited by examiner

*Primary Examiner* — Tim T Vo
(74) *Attorney, Agent, or Firm* — NIXON & VANDERHYE P.C.

(57)          ABSTRACT

An interconnect circuit comprises an unblock-request-receiving interconnect circuit node configured to receive a given write push request specifying write target data and write target address information identifying one or more addressed locations to which the write target data is to be written, and to enforce a requirement that a conflicting read request, which requests a read to one of the one or more addressed locations identified by the write target address information specified by the given write push request, is blocked from completing until an unblocking condition is satisfied for the given write push request, where for at least one type of write push request, satisfaction of the unblocking condition is dependent on an unblock request for the given write push request being received by the unblock-request-receiving interconnect circuit node; and an unblock-request-transmitting interconnect circuit node configured to transmit the given write push request to the unblock-request-receiving interconnect circuit node, and to transmit the unblock request for the given write push request in response to receipt of a completion response for an older write push request transmitted by the unblock-request-transmitting interconnect circuit node.

20 Claims, 18 Drawing Sheets unblock-request-transmitting interconnect circuit node unblock-request-receiving interconnect circuit node <u>120</u> Strong-order-requiring request source requires transmission of set of strongly ordered write push requests to different target nodes <u>122</u> transmit initial write push request as implicit unblock type of write push request <u>126</u> transmit next write push request as implicit unblock type of write push request

—Y—

<u>124</u> does next write push request specify same target node as preceding write push request of the set of strongly ordered write push requests?

—N—

<u>128</u> transmit next write push request as explicit unblock type of write push request

—N—

<u>130</u> completed transmission of all of the set of strongly ordered write push requests?

Y

<u>132</u> handle other incoming request

FIG. 10

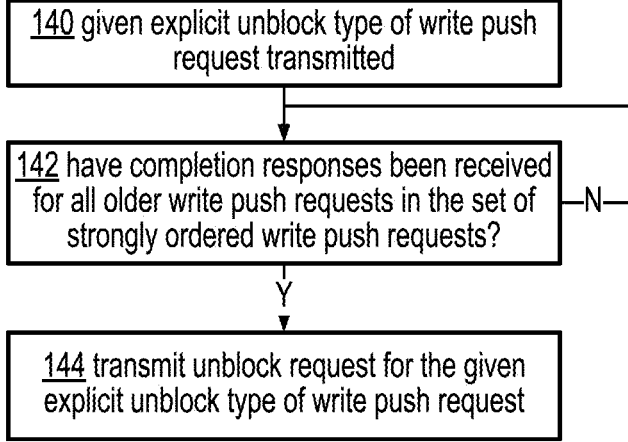

<u>140</u> given explicit unblock type of write push request transmitted

<u>142</u> have completion responses been received for all older write push requests in the set of strongly ordered write push requests?

—N—

Y

<u>144</u> transmit unblock request for the given explicit unblock type of write push request

FIG. 11 reserved tracking entry
per strong-order-requiring
request source

UNBLOCK REQUEST

BACKGROUND

Technical Field

The present technique relates to the field of data processing systems.

Technical Background

A data processing system may have an interconnect for connecting components of the system, such as compute logic, input/output devices and/or memory storage. The interconnect may respond to read/write requests initiated by a requester, and route corresponding transactions over the interconnect to a recipient which may act upon the request.

SUMMARY

At least some examples of the present technique provide an unblock-request-transmitting interconnect circuit node, comprising: transmitting interface circuitry configured to transmit outgoing requests based on one or more incoming requests received from at least one request source, each outgoing request specifying a target node to which that outgoing request is to be transmitted; and control circuitry configured to control the transmitting interface circuitry; in which: in response to at least one incoming write request received from a strong-order-requiring request source requiring transmission of a set of strongly ordered write push requests subject to an ordering requirement preventing a younger request from being observed as completing before an older request, each write push request specifying write target data and write target address information for identifying one or more addressed locations to which the write target data is to be written, and the set of strongly ordered write push requests comprising at least a first write push request which specifies a first target node and a second write push request which is younger than the first write push request and specifies a second target node, the control circuitry is configured to control the transmitting interface circuitry to: transmit the first write push request specifying the first target node; prior to a completion response being received from the first target node for the first write push request, transmit the second write push request specifying the second target node; and in response to the completion response being received from the first target node for the first write push request, transmit an unblock request specifying the second target node, the unblock request indicating that an unblocking condition is allowed to become satisfied for the second write push request enabling the second target node or a further node downstream of the second target node to release a block on completion of a conflicting read request which requests a read to one of said one or more addressed locations identified by the write target address information specified by the second write push request.

At least some examples of the present technique provide an unblock-request-receiving interconnect circuit node, comprising: receiving interface circuitry configured to receive a given write push request specifying write target data and write target address information identifying one or more addressed locations to which the write target data is to be written; and read blocking control circuitry configured to enforce a requirement that a conflicting read request, which requests a read to one of the one or more addressed locations identified by the write target address information specified by the given write push request, is blocked from completing until an unblocking condition is satisfied for the given write push request, where for at least one type of write push request, satisfaction of the unblocking condition is dependent on an unblock request for the given write push request being received by the receiving interface circuitry.

At least some examples of the present technique provide an interconnect circuit comprising: an unblock-request-receiving interconnect circuit node configured to receive a given write push request specifying write target data and write target address information identifying one or more addressed locations to which the write target data is to be written, and to enforce a requirement that a conflicting read request, which requests a read to one of the one or more addressed locations identified by the write target address information specified by the given write push request, is blocked from completing until an unblocking condition is satisfied for the given write push request, where for at least one type of write push request, satisfaction of the unblocking condition is dependent on an unblock request for the given write push request being received by the unblock-request-receiving interconnect circuit node; and an unblock-request-transmitting interconnect circuit node configured to transmit the given write push request to the unblock-request-receiving interconnect circuit node, and to transmit the unblock request for the given write push request in response to receipt of a completion response for an older write push request transmitted by the unblock-request-transmitting interconnect circuit node.

At least some examples of the present technique provide a system comprising: the interconnect circuit as described above, implemented in at least one packaged chip; at least one system component; and a board, wherein the at least one packaged chip and the at least one system component are assembled on the board.

At least some examples of the present technique provide a chip-containing product comprising the system described above, wherein the system is assembled on a further board with at least one other product component.

At least some examples of the present technique provide a non-transitory computer-readable medium storing computer-readable code for fabrication of the unblock-request-transmitting interconnect circuit node or the unblock-request-receiving interconnect circuit node described above.

Further aspects, features and advantages of the present technique will be apparent from the following description of examples, which is to be read in conjunction with the accompanying drawings.

BRIEF DESCRIPTION OF THE DRAWINGS

FIG. 10 illustrates steps for determining whether to issue a given write push request as an implicit unblock type of write push request or an explicit unblock type of write push request;

FIG. 11 illustrates steps for determining when to transmit an unblock request;

DESCRIPTION OF EXAMPLES

Figure 1:
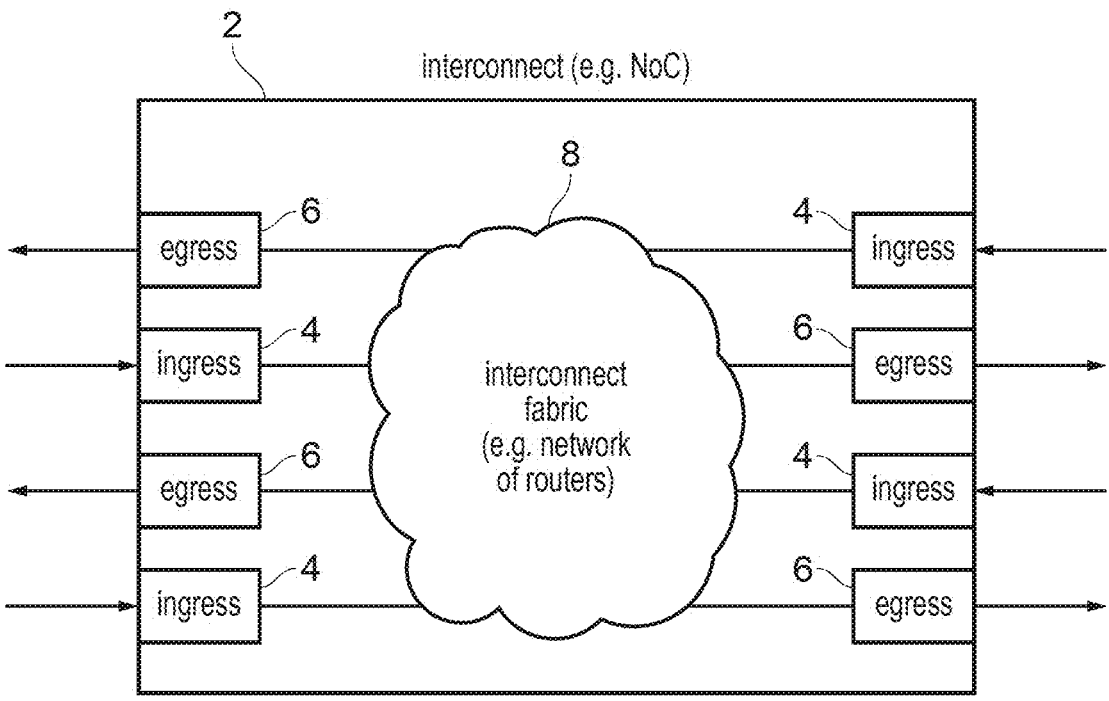
FIG. 1 illustrates an example of an interconnect circuit.

An interconnect circuit may support a write push request, for which a request transmitting node transmits, to a target node, a write push request specifying both write target data and write target address information for identifying one or more addressed locations to which the write target data is to be written. A write push technique can be simpler to implement than a write pull technique in which the write target data is not sent with the initial write pull request that specifies the write target address information, but is instead sent later once the target node has confirmed that it is ready to accept the write target data.

A given interconnect circuit node may receive incoming write requests from a strong-order-requiring request source requiring transmission of a set of strongly ordered write push requests subject to an ordering requirement preventing a younger request from being observed as completing before an older request. Enforcing the ordering requirement imposed by the strong-order-requiring request source may be particularly challenging in cases where the set of strongly ordered write push requests comprises write push requests specifying different target nodes, which nevertheless are required to be observed as completing in a given order. As one target node may be unaware of the progress of other ordered write push requests at a different target node, the responsibility for ensuring that the requests to different target nodes are ordered relative to each other can therefore lie with an interconnect circuit node upstream from the point at which requests diverge to the respective target nodes. In a typical interconnect scheme supporting the write push technique for handling writes to memory, such order enforcement is typically implemented by delaying transmission of a younger write push request to a second target node until an older write push request targeting a first target node has received a completion response from the first target node. This serializes processing of the write push requests, and can cause significant delays, limiting the memory access bandwidth that can be provided to a strong-order-requiring request source.

In the examples discussed below, an unblock request is supported, which can be transmitted from an unblock-request-transmitting interconnect circuit node to an unblock-request-receiving interconnect circuit node. The unblock request indicates to the unblock-request-receiving interconnect circuit node that an unblocking condition is allowed to become satisfied for a corresponding write push request, enabling release of a block on completion of a conflicting read request which requests a read to one of the one or more addressed locations identified by the write target address information specified by that write push request. By restricting completion of read requests until the unblocking condition is satisfied, this prevents the write target data for a given write push request being observable by read requests until the unblocking condition is satisfied, which is helpful for enforcing the ordering requirement. By providing an unblock request which explicitly denotes the point at which the unblocking condition is allowed to become satisfied, an upstream interconnect circuit node can control the timing at which write target data becomes observable for a write push request already sent to a downstream interconnect circuit node, rather than having to rely solely on not sending the write push request at all if the write target data should not yet be observed by readers. Therefore, this enables an upstream interconnect circuit node to send a younger write push request of the set of strongly ordered write push requests prior to a completion response being received from a target node for an older write push request, which is helpful for reducing latency and improving memory bandwidth available to the strong-order-requiring request source.

Hence, according to examples discussed further below, an unblock-request-transmitting interconnect circuit node comprises transmitting interface circuitry configured to transmit outgoing requests based on one or more incoming requests received from at least one request source, each outgoing request specifying a target node to which that outgoing request is to be transmitted; and control circuitry configured to control the transmitting interface circuitry. In response to at least one incoming write request received from a strong-order-requiring request source requiring transmission of a set of strongly ordered write push requests subject to an ordering requirement preventing a younger request from being observed as completing before an older request (each write push request specifying write target data and write target address information for identifying one or more addressed locations to which the write target data is to be written, and the set of strongly ordered write push requests comprising at least a first write push request which specifies a first target node and a second write push request which is younger than the first write push request and specifies a second target node), the control circuitry is configured to control the transmitting interface circuitry to transmit the first write push request specifying the first target node, and prior to a completion response being received from the first target node for the first write push request, transmit the second write push request specifying the second target node. In response to the completion response being received from the first target node for the first write push request, the transmitting interface circuitry transmits an unblock request specifying the second target node, the unblock request indicating that an unblocking condition is allowed to become satisfied for the second write push request enabling the second target node or a further node downstream of the second target node to release a block on completion of a conflicting read request which requests a read to one of said one or more addressed locations identified by the write target address information specified by the second write push request.

With this approach, the unblock-request-transmitting interconnect circuit node can enforce the strong ordering requirement in a more efficient way than simply serializing the processing of the ordered set of write push requests, by enabling a younger write push request to a second target node to be transmitted before the completion response of an older write push request is received from a first target node. The unblock request can be sent once the first write push request's completion response has been received, to unblock handling of any conflicting reads that an address overlapping with any addresses written to by the second write push request.

The unblock request could be transmitted over the same interconnect as the write push requests, or could be transmitted over a separate interconnect from the interconnect used to transmit the write push requests (e.g. the unblock request could be sent over a sideband interconnect used for sideband communications in parallel with mainband communications on a mainband interconnect used for the write push requests).

The unblock request could in some examples be a dedicated request type, separate from other request types, which is communicated in a separate transmission from a request/transmission representing other request types.

In other examples, the unblock request could be represented by an existing type of transaction or communication packet (also used for purposes other than the unblock request), which specifies at least one parameter that denotes that this request should be treated as an unblock request. For example, read/write transactions or control command packets could have spare encoding space for carrying at least one field that identifies that an unblock request is being sent (the spare encoding space could also be used to provide an identifier of a corresponding write push request which is able to be unblocked based on that unblock request). Hence, references to the unblock request below may encompass an unblock request communicated in a same transmission as another type of request/response.

Other examples may support both dedicated unblock requests and the ability for an unblock request to "piggy back" on another type of transmission. This can allow more efficient use of bandwidth when possible by encoding an unblock request in spare encoding space within another type of transmission when there is another type of transmission due to be sent to the target node required to receive the unblock request, but if there is no other transmission due to be sent to the required target node, or any transmission to that target node does not have spare encoding space to accommodate the unblock request, it is also possible to send the unblock request as an independent request.

The unblock request indicates that the unblocking condition is allowed to become satisfied. However, the unblocking condition does not necessarily need to become satisfied immediately upon receipt of the unblock request. The unblocking condition could also depend on other conditions, such as a completion response being received for the second write push request and/or completion responses being received for an older write push request targeting the same second target node as the second write push request. However, for at least one type of write push request, receipt of the unblock request may be a prerequisite for the unblocking condition to become satisfied, to enable a block on completion of conflicting reads to be released.

It is not essential for the unblock request to be used for all write push requests in the set of strongly ordered write push requests. In some examples, write push requests targeting the same target node may already be subject to an ordering requirement requiring the target node to ensure those write push requests are observed as completing in the order that the write push requests are received (this does not necessarily require the write push requests to actually complete in that order, but if reordered no reader should be able to read the affected memory locations and see a different view from the view that would arise if the write push requests were actually performed in order). Hence, the control circuitry of the unblock-request-transmitting interconnect circuit node may be configured to assume that any write push requests specifying the same target node will be subject to ordering control by a downstream interconnect circuit node, to ensure that a younger request to a given target node is prevented from being observed as completing before an older request to the same given target node.

Therefore, if downstream interconnect circuit nodes can already be assumed to handle requests to the same target node in the correct order, the explicit unblock request may not be needed in cases where older and younger write push requests of the set of strongly ordered write push requests specify the same target node. The use of the explicit unblock request may be reserved for cases where a younger write push request specifies a different target node to a preceding older write push request in the set of strongly ordered write push requests.

Hence, it can be useful to support different types of write push requests, such that a given write push request of the set of strongly ordered write push requests specifies unblock type information indicative of whether the give write push request is an explicit unblock type of write push request for which the unblock request is required to be transmitted to enable the unblocking condition to be satisfied for the explicit unblock type of write push request, or an implicit unblock type of write push request for which the unblocking condition is allowed to be satisfied even if no unblock request has been transmitted for the implicit unblock type of write push request. For example, the unblock type information could be a transaction type identifier distinguishing the explicit unblock type of write push request from the implicit unblock type of write push request, or another control parameter associated with the write push request. By supporting both explicit and implicit unblock types of write push request, the explicit unblock type can be useful for more efficiently controlling ordering in cases where strongly ordered write push requests specify different target nodes as described above, but in cases where the ordered write push requests specify the same target node, the implicit unblock type can be used to enable the unblocking condition to be satisfied without requiring an explicit unblock request to be transmitted, which can improve performance by enabling conflicting reads to be unblocked earlier and by conserving interconnect bandwidth by not transmitting explicit unblock requests as often.

Hence, in some examples, the control circuitry is configured to control the transmitting interface circuitry to transmit the given write push request as the explicit unblock type of write push request, when the given write push request is not an initial write push request of the set of strongly ordered write push requests and specifies a different target node to a target node specified for a preceding write push request of the set of strongly ordered write push requests; and transmit the given write push request as the implicit unblock type for the given write push request, when the given strongly ordered write push request is the initial write push request or specifies a same target node as the preceding strongly ordered write push request of the set.

In some examples, the transmitting interface circuitry is configured to transmit the set of strongly ordered write push requests on a communication channel which provides a guarantee that a set of strongly ordered write push requests corresponding to a first strong-order-requiring request source cannot cause blocking of a set of strongly ordered write push requests corresponding to a second strong-order-requiring request source. This is not essential in systems which only have one strong-order-requiring request source. However, if there are multiple strong-order-requiring request sources present in the same system, it can be useful to provide such guarantee of non-blocking between different strong-order-requiring request sources, to mitigate against risk of deadlock where the respective sets of strongly ordered write push requests corresponding to the first and second strong-order-requiring request sources both cannot complete because they contend for resource on an interconnect or at a downstream circuit node, and are each waiting for progress of an interconnect message which is blocked from making forward progress by a message associated with the other set of strongly ordered write push requests.

The non-blocking guarantee could be implemented on the communication channel in different ways. In some examples, the transmitting interface circuitry may allocate the set of strongly ordered write push requests corresponding to the first strong-order-requiring request source to a first resource plane different from a second resource plane allocated for handling the set of strongly ordered write push requests corresponding to the second strong-order-requiring request source, the first resource plane and second resource plane providing separate hardware resources for communication of requests on the communication channel. For example, the first and second resource planes could provide different buffers for buffering communication packets received on the communication channel, to ensure that a stalled request in one buffer cannot block a request allocated to another buffer. By allocating the respective sets of strongly ordered write push requests for the first and second strong-order-requiring request sources to different resource planes, this reduces risk of deadlock.

Another way of providing the non-blocking guarantee can be to implement a credit scheme for the communication link, with different types of credits used to negotiate access to the communication link for the requests corresponding to the different strong-order-requiring request sources. With this approach, although the communication channel may comprise shared hardware resource (e.g. buffer circuitry) shared between the set of strongly ordered write push requests corresponding to the first strong-order-requiring request and the set of strongly ordered write push requests corresponding to the second strong-order-requiring request source, the transmitting interface circuitry is configured to manage transmission of the set of strongly ordered write push requests corresponding to the first strong-order-requiring request source based on availability of a first type of credit different to a second type of credit used to manage transmission of the set of strongly ordered write push requests corresponding to the second strong-order-requiring request source. By using different types of credits to manage the utilisation of communication link bandwidth for the respective sets of strongly ordered write push requests corresponding to different strong-order-requiring request sources, the credits can be used to give a guarantee that there is some communication bandwidth or resource available to allow each set of strongly ordered write push requests to make forward progress, reducing risk of deadlock.

The strong-order-requiring request source could be any source of incoming requests that may impose a strong ordering requirement requiring that any write push requests that are generated based on the incoming requests from that source are observed as completing in a given order. One particular example may be where the strong-order-requiring request source comprises a PCIe source (e.g. a root port) configured to generate the incoming requests based on PCIe transactions received on a PCIe communications link. PCIe is an input/output interface protocol commonly used for the interface between input/output devices and a host compute system. The latest generations of the PCIe standard impose increased memory bandwidth requirements on the host compute system. However, a challenge for keeping up with such memory bandwidth requirements is that PCIe also imposes a strong ordering model, which can be stricter than the ordering model which would otherwise be implemented on the interconnect circuit for requests from other non-PCIe sources. When dealing with a PCIe source triggering a set of strongly ordered write push requests striped across multiple target nodes, typical interconnects enforce the strong PCIe ordering requirement by serializing the transmission of the write push requests. However, this approach may struggle to satisfy the bandwidth requirements imposed by later generations of PCIe. By supporting the unblock request as explained above, the strong order requirements imposed by PCIe can be enforced in a more efficient manner, improving the throughput of a set of strongly ordered write push requests initiated based on an incoming transaction from a PCIe source, and hence enabling the increased bandwidth requirements of later PCIe generations to be satisfied.

In other examples, the strong-order-requiring request source could be a chiplet or further interconnect which is coupled to the interconnect comprising the unblock-request-transmitting interconnect circuit node, where that chiplet or further interconnect comprises or is in communication with a PCIe source. Hence, the PCIe source may not necessarily be directly coupled to the unblock-request-transmitting interconnect circuit node, but there could be one or more other interconnects or chip-to-chip communication links intervening between the PCIe source and the unblock-request-transmitting interconnect circuit node.

The unblock-request-transmitting interconnect circuit node can be any interconnect circuit node which is at, or upstream of, the point of the interconnect at which the first and second write push requests diverge to the respective first and second target nodes. However, in some examples, the unblock-request-transmitting interconnect circuit node comprises an ingress interface for an interconnect, and the ingress interface comprises protocol conversion circuitry configured to convert between incoming requests defined according to an upstream protocol used by the at least one request source and the outgoing requests defined according to an interconnect transport protocol used by the interconnect. For example, the upstream protocol could be the AMBA® AXI protocol. It can be useful to implement the control circuitry responsible for controlling transmission of unblock requests at an ingress interface, because the ingress interface may be the point at which any specific requirements for a strong-order-requiring request source can most easily be implemented, as a design of ingress interface may be chosen which corresponds to the type of request source to which it is connected. For example, the unblock-request-transmitting interconnect circuit node could support features specific to PCIe request sources, for implementing requirements of PCIe. By implementing the unblock-request-transmitting functionality at the ingress point at which requests from a strong-order-requiring request source enter the interconnect circuit and are mapped to the internal transport protocol of the interconnect, this avoids making internal components of the interconnect circuit, such as request routers, more complicated, and limits the points of the interconnect at which unblock requests are to be generated to those ingress points which are in communication with a strong-order-requiring request source.

In some examples, an unblock-request-receiving interconnect circuit node is provided, which comprises receiving interface circuitry configured to receive a given write push request specifying write target data and write target address information identifying one or more addressed locations to which the write target data is to be written; and read blocking control circuitry configured to enforce a requirement that a conflicting read request, which requests a read to one of the one or more addressed locations identified by the write target address information specified by the given write push request, is blocked from completing until an unblocking condition is satisfied for the given write push request, where for at least one type of write push request, satisfaction of the unblocking condition is dependent on an unblock request for the given write push request being received by the receiving interface circuitry. This works in a complementary manner to the unblock-request-receiving interconnect circuit node described earlier, and for similar reasons helps to support more efficient handling of a strongly ordered set of write push requests. As the upstream interconnect circuit node transmitting the given write push request can rely on the unblock-request-receiving interconnect circuit node not allowing conflicting reads to complete until the unblock request is transmitted/received, the upstream node is free to transmit the given write push request before a completion response has been received for an older write push request in a set of strongly ordered write push requests initiated based on a strong-order-requiring request source, hence improving throughput for such strongly ordered write push requests.

The conflicting read request, which is blocked from completing until the unblocking condition is satisfied for the given write push request, could be a read request received after the given write push request is received, or could be a read request which is not yet complete at the time the given write push request is received but which is received before the given write push request is received.

The read blocking control circuitry enforces the requirement that a conflicting read request is blocked from completing until the unblocking condition is satisfied for the given write push request. This can be enforced in different ways.

In some examples, the read blocking control circuitry comprises tracking circuitry to maintain one or more tracking entries, where each tracking entry is configured to track address information corresponding to a given write push request for which the unblocking condition is not yet satisfied. In response to a given read request received at the receiving interface circuitry, the read blocking control circuitry determines whether to block completion of the given read request based on a lookup of read target address information of the given read request in the tracking circuitry to determine whether the read target address information corresponds to the address information tracked by a tracking entry for a write push request for which the unblocking condition is not yet satisfied. The tracking information can be updated in response to events such as completion of write push requests and/or receipt of the unblock request, and once the unblocking condition is satisfied for a given write push request, the corresponding tracking information can be cleared or invalidated to indicate that there is no longer a block on conflicting reads completing.

It can be useful for the tracking circuitry to reserve at least one dedicated tracking entry per strong-order-requiring request source (distinguished by a request source identifier in the given write push request which identifies the request source which caused the given write push request to be transmitted to the receiving interface circuitry). Each strong-order-requiring request source comprises a request source capable of causing a transmission of a set of strongly ordered write push requests which are subject to an ordering requirement preventing a younger request from being observed as completing before an older request. Not all request sources need to be strong-order-requiring request sources. Some systems may only have one strong-order-requiring request source. However, in systems where there are two or more strong-order-requiring request sources, reserving at least one dedicated tracking entry per strong-order-requiring request source can be helpful to mitigate against risk of deadlock (as discussed further below with respect to FIGS. 15 and 16).

As noted above, in some examples the read blocking control circuitry of the unblock-request-receiving interconnect circuit node is itself directly responsible for maintaining tracking information tracking write push requests and looking up the tracking information to ensure that conflicting reads are blocked from completing while an outstanding write push request has not yet had its unblocking condition satisfied.

However, this is not essential, and in other examples, the unblock-request-receiving interconnect circuit node that receives (and acts on) the unblock request may not itself maintain such tracking information, but can enforce the ordering requirement by controlling, based on receipt of the unblock message, the timing of when a message is sent to a downstream node that is responsible for tracking write push requests and controlling unblocking of read requests.

For example, the read blocking control circuitry may enforce the requirement for the conflicting read request by delaying a timing of transmitting a write completion acknowledgement for the write push request to a downstream circuit node until the unblocking condition is satisfied for the write push request, the write completion acknowledgement indicating that the downstream circuit node is allowed to release a block on completion of the conflicting read request. A write completion acknowledgement may be a message supported as part of a write pull flow to indicate to a downstream circuit node when it can allow conflicting reads to read the write target data transmitted for an earlier write pull request to a conflicting address. This approach of mapping the unblock request to a corresponding write completion acknowledgement (and delaying the timing of transmission of the write completion acknowledgement until the unblock request can be received) can be useful in cases where the write push request specifies an address which maps to a location accessed via a downstream interconnect which uses a protocol implementing a write pull flow, in contrast to the write push flow used in the interconnect comprising the unblock-request-transmitting interconnect circuit node and unblock-request-receiving interconnect circuit node. By controlling the timing of the write completion acknowledgement based on receipt of the unblock request, the strong ordering requirement of the upstream strong-order-requiring request source can still be respected even if there is a protocol conversion between the unblock-request-transmitting interconnect circuit node and the ultimate completer node which will implement the memory write operation corresponding to the write push request.

Similar to the unblock-request-transmitting interconnect circuit node, the unblock-request-receiving interconnect circuit node may support the given write push request specifying unblock type information indicative of whether the give write push request is an explicit unblock type of write push request for which the unblock request is required to be received to enable the unblocking condition to be satisfied for the explicit unblock type of write push request, or an implicit unblock type of write push request for which the unblocking condition is allowed to be satisfied even if no unblock request has been received for the implicit unblock type of write push request. By using the implicit unblock type of write push request when possible, many write push requests can have any conflicting reads unblocked earlier (as they do not need to wait for an explicit unblock message), improving performance for reads. Nevertheless, the explicit unblock type of write push request supports improved control of ordering between write push requests targeting different target nodes, for the reasons explained above.

When the given write push request is the explicit unblock type of write push request, satisfaction of the unblocking condition may be dependent on each of the following conditions being satisfied: the unblock request has been received for the given write push request; a write completion response has been received for the given write push request; and the unblocking condition is satisfied for any older write push request of a set of strongly ordered write push requests comprising the given write push request.

On the other hand, when the given write push request is the implicit unblock type of write push request, satisfaction of the unblocking condition may be dependent on each of the following conditions being satisfied, independent of whether any unblock request has been received for the given write push request: a write completion response has been received for the given write push request; and when the given write push request is one of a set of strongly ordered write push requests, the unblocking condition is satisfied for any older write push request of the set of strongly ordered write push requests.

The receiving interface circuitry may receive the given write push request on a communication channel which provides a guarantee that a set of strongly ordered write push requests corresponding to a first strong-order-requiring request source cannot cause blocking of a set of strongly ordered write push requests corresponding to a second strong-order-requiring request source. In some examples, the guarantee is provided by use of separate resource planes providing separate hardware resources for communication of requests from the first strong-order-requiring request source and the second strong-order-requiring request source respectively. In some examples, the communication channel comprises shared hardware resource shared between the set of strongly ordered write push requests corresponding to the first strong-order-requiring request and the set of strongly ordered write push requests corresponding to the second strong-order-requiring request source; and the guarantee is enforced by the receiving interface circuitry managing reception of the set of strongly ordered write push requests corresponding to the first strong-order-requiring request source based on signalling to an upstream circuit node availability of a first type of credit, and managing reception of the set of strongly ordered write push requests corresponding to the second strong-order-requiring request source based on signalling to an upstream circuit node availability of a second type of credit. Providing such guarantees of non-blocking helps to reduce risk of deadlock.

The unblock-request-receiving interconnect circuit node may be any circuit node capable of receiving write push requests, but in some examples the unblock-request-receiving interconnect circuit node comprises an egress interface for an interconnect. The egress interface comprising protocol conversion circuitry configured to convert between incoming requests defined according to an interconnect transport protocol used by the interconnect and outgoing requests defined according to a downstream protocol used by a downstream circuit node.

It will be appreciated that in some examples the same interconnect circuit node could function as both an unblock-request-transmitting interconnect circuit node and an unblock-request-receiving interconnect circuit node. In other examples, different types of circuit node serve as unblock-request-transmitting interconnect circuit node and unblock-request-receiving interconnect circuit node respectively.

In some examples, an unblock-request-transmitting interconnect circuit node could be licensed as part of a standalone component which does not necessarily also comprise an unblock-request-receiving interconnect circuit node (the unblock-request-receiving interconnect circuit node which processes the unblock request transmitted by the unblock-request-transmitting interconnect circuit node could be part of a separately licensed component or could be on a separate integrated circuit or chiplet). Hence, it is not essential for a given component manufactured or licensed by a given entity to comprise both types of interconnect circuit node.

However, some examples provide an interconnect circuit comprising both at least one unblock-request-receiving interconnect circuit node and at least one unblock-request-transmitting interconnect circuit node.

Specific examples are now described with reference to the drawings.

FIG. 1 schematically illustrates an example of an interconnect 2 for connecting components of a computing system. In particular, the interconnect may be an on-chip interconnect for an integrated circuit (although some interfaces of the interconnect may be coupled to an off-chip component located on a different integrated circuit). For example, interconnect may comprise a network-on-chip. Interconnect 2 supports routing of read transactions and write transactions (and associated response messages) across the interconnect between components coupled to the interconnect. Those components could include, for example, compute logic such as a central processing unit (CPU), graphics processing unit (GPU) or other processor; memory storage circuitry such as a DRAM (dynamic random access memory) unit (or memory controllers for controlling such memory storage circuitry); input/output device interfaces for communicating via an input/output communication link with peripheral devices; and/or chip-to-chip interfaces for communicating across a chip-to-chip link in a multi-chip processing system.

The interconnect 2 comprises a number of ingress interfaces 4 at which requests (e.g. read/write requests) initiated by a request source (and responses received from the request source in response to requests previously transmitted to the request source) are received at the interconnect 2. The interconnect 2 also includes a number of egress interfaces 6 at which requests (e.g. read/write requests) are transmitted to corresponding downstream circuit nodes and/or responses to requests previously received from the downstream circuit node are transmitted to the downstream circuit node.

Each ingress interface 4 comprises protocol conversion circuitry to convert between an incoming communication protocol (used on the communication link between the corresponding request source and the ingress interface 4) and an internal interconnect transport protocol used by interconnect fabric 8 which routes messages from an ingress interface 4 to a corresponding egress interface 6. Each egress interface 6 similarly comprises protocol conversion circuitry to convert between the internal interconnect transport protocol and an outgoing communication protocol used on the communication link between the egress interface 6 and a corresponding downstream circuit node. There could be two or more types of ingress interface 4, and/or two or more types of egress interface 6, which correspond to different communication protocols as the incoming/outgoing communication protocol. There could also be multiple instances of a same type of ingress interface 4 or egress interface 6.

The interconnect fabric 8 may comprise a network of components for routing communications transmitted by an ingress interface 4 to a corresponding egress interface 6 specified as a target node for the communication. For example the interconnect fabric 8 may comprise a network of routers, each router selecting, based on target node information specified for an incoming communication packet, which of two or more alternate interconnect paths that communication packet should be transmitted on, to cause the packet to be routed to a corresponding target node (e.g. egress interface). Also, the interconnect fabric 8 could include other components such as serializing/deserializing components for packing/unpacking communication packets to adjust the data width of communication packets at an interface between wider/narrower data channels, clock/voltage domain bridge components located to bridge between components in different clock or voltage domains, etc.

Figure 2:
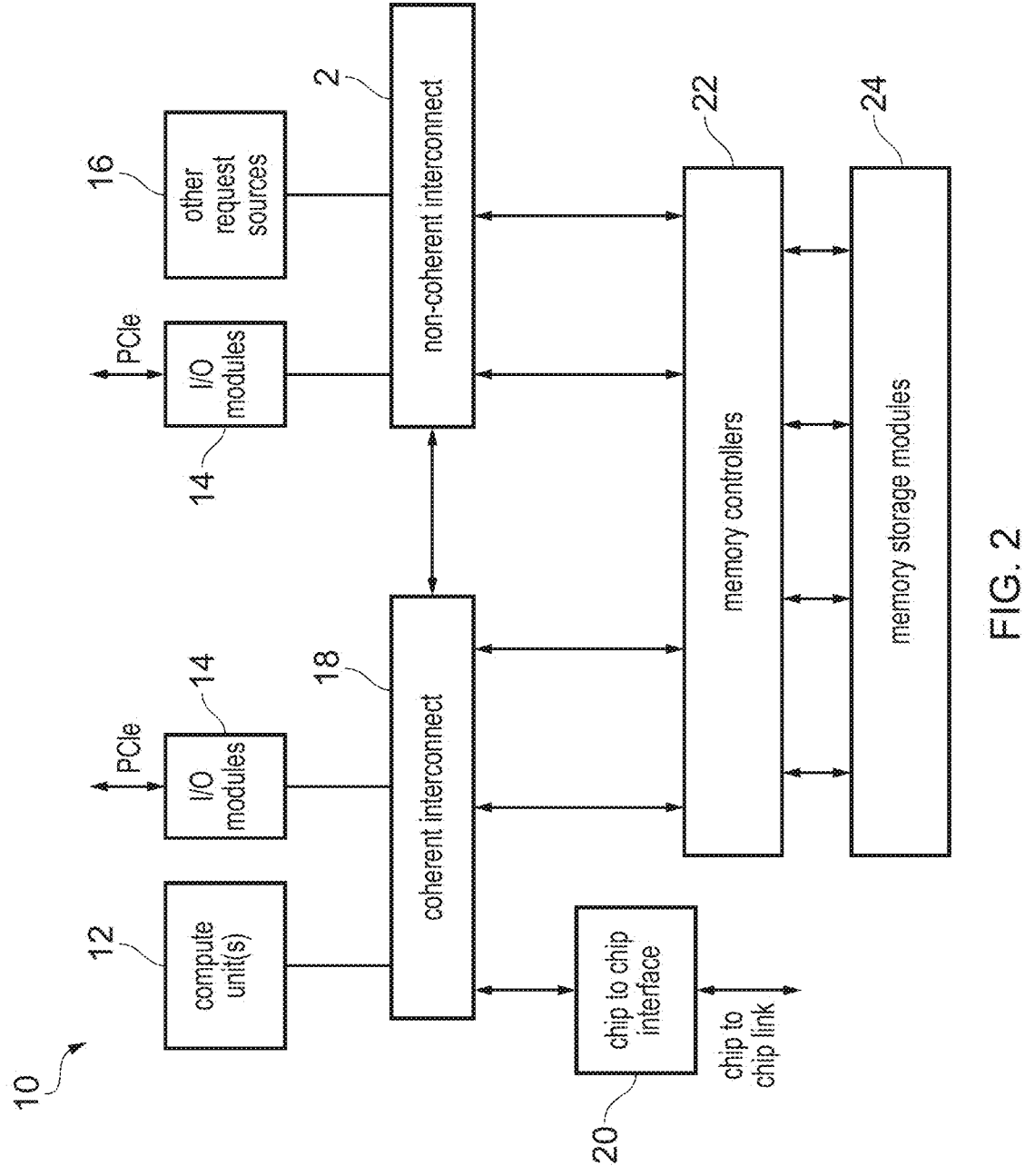
FIG. 2 illustrates an example of a data processing system.

FIG. 2 illustrates an example of a data processing system 10 which can use an interconnect 2 as shown in FIG. 1. It will be appreciated that FIG. 2 shows just one illustrative example of possible system components that may be interconnected using the interconnect 2, and since the interconnect supports an agreed protocol by which components designed by different providers can easily be interconnected when integrated into the same system, there is considerable flexibility to vary the system design and choice of interconnected components, so the particular arrangement and types of interconnected components shown in FIG. 2 is not essential.

The system 10 includes a number of compute units 12, such as CPUs, GPUs or other types of processor, capable of performing computations on data obtained from system memory 24. Memory storage modules 24 providing the system memory are controlled by memory controllers 22. The system also includes a number of input/output (I/O) modules 14 for interfacing, e.g. over an input/output bus such as a PCIe link, with peripheral devices such as user interface devices, external network controllers, display controllers, external memory storage, etc. The system can also include various other request sources 16 capable of accessing the shared memory 24. Those other request sources 16 may include specialized processing engines such as a security control processor or cryptographic engine, hardware accelerators providing expansion functionality, and so on. Another source of requests for accessing the shared memory 24 may be a chip-to-chip interface 20 by which the integrated circuit comprising the system 10 communicates with another similar integrated circuit to implement a multi-chiplet processing system where the compute logic 12 and memory storage 24 of a processing system are distributed over multiple chiplets (separate integrated circuits implemented on separate silicon dies).

In this example, the interconnect 2 described with reference to FIG. 1 is a non-coherent interconnect which couples some of the I/O modules 14 and other request sources 16 to the memory controllers 22 which give access to system memory 24, but does not support a hardware-enforced coherency protocol. The non-coherent interconnect 2 also has an interface to a coherent interconnect 18 which is used to couple the compute unit 12 and other I/O modules 14 and the chip-to-chip interface 20. The coherent interconnect 18 implements a hardware-managed coherency protocol used to enforce coherency of data cached in private caches of the compute units 12, I/O modules 14, or other chiplet connected via the chip-to-chip interface 20. For example, the coherent interconnect 18 could support the AMBA® CHI protocol implemented by Arm Limited. While in this example, the non-coherent interconnect 2 does not support any hardware-managed coherency protocol, it will be appreciated that in other examples the interconnect 2 comprising the ingress/egress interfaces 4, 6 supporting the unblock request described below could be a coherent interconnect. While in FIG. 2, the chip-to-chip interface 20 is coupled to the coherent interconnect 18, in other examples the non-coherent interconnect 2 could support ingress/egress ports for communicating with such a chip-to-chip interface 20.

Hence, when the interconnect 2 of FIG. 1 is used in the context of the data processing system 10 shown in FIG. 2, the interconnect 2 may comprise at least one pair of ingress/egress ports 4, 6 corresponding to each of the connected components 14, 16, 22, 18 that are connected to the interconnect 2.

As shown in the example of FIG. 2, the system 10 may include at least one request source (a component acting as a source of requests transmitted to the interconnect 12) which imposes a strong ordering requirement on write requests handled by the interconnect 2. An example of such a strong-order-requiring request source may be a PCIe source such as one of the I/O modules 14 coupled via a PCIe link to an external peripheral device or other PCIe endpoint. A strong-order-requiring request source could be another component, such as another interconnect 18 or chiplet, which itself receives requests from a PCIe source 14.

Figure 3:
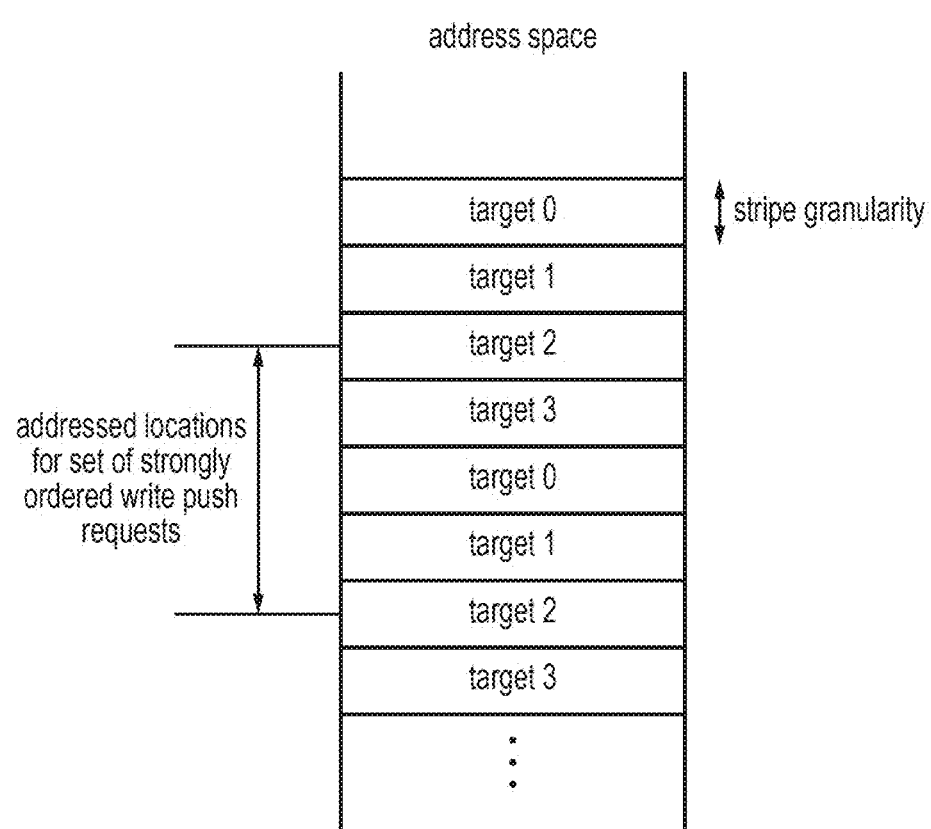
FIG. 3 illustrates an example of address striping.

The PCIe standards may, as a default memory model to be imposed in absence of any PCIe request specifying that a more relaxed ordering is acceptable, define a strong ordering requirement requiring that, for a given set of write requests initiated by the PCIe source 14, it is not permitted for a younger write request from that PCIe source to be observed (by any other system component reading the addresses written to by the younger write request) as having completed ahead of an older write request from that PCIe source. This may be a stricter ordering requirement than would otherwise be required for handling write requests on the interconnect 2 which are initiated by other non-strong-order-requiring request sources (e.g. for write requests initiated based on instructions executed by the compute units 12). This ordering requirement may be particularly challenging to enforce on interconnects 2 which supports a write push mode of handling write requests, in which, when a write request is received on the interconnect, the ingress interface 4 receiving that request initiates a write push transaction which, in the initial request transmitted for that transaction which specifies the address information identifying the memory locations to be written with updated write data, also transmits the write data itself so that a downstream circuit node can immediately start to act upon that write request and cause the relevant memory system location to be updated with the write data. This contrasts with a write pull flow in which the initial request to start a write transaction does not itself provide the write data, and the write data is sent only once the recipient of the data has sent a response message indicating they are ready to receive the write data. With the write push flow implemented in typical interconnect protocols, there is little option for a transmitter of a write push request to control the timing at which the write data for that write push request can be observed by conflicting reads, as once the write push request is sent, the target node of that write push request is free to act on the corresponding write request and cause the write data to become visible. This can be problematic in systems comprising a strong-order-requiring request source such as a PCIe source 14, especially if memory striping is implemented as shown in FIG. 3. A system may implement memory striping, where consecutive regions of address space are mapped to different target nodes of the system 10 (e.g. nodes corresponding to two or more memory controllers 22 corresponding to separate memory storage modules). Such memory striping can be helpful for distributing requests expected to be issued in a given time window across different recipients to help improve throughput of processing the requests. Hence, when a strong-order-requiring request source 14 issues one or more write requests targeting a given set of consecutive addressed locations, those locations may be mapped across multiple different target nodes of the system 10 as shown in FIG. 3.

Figure 4:
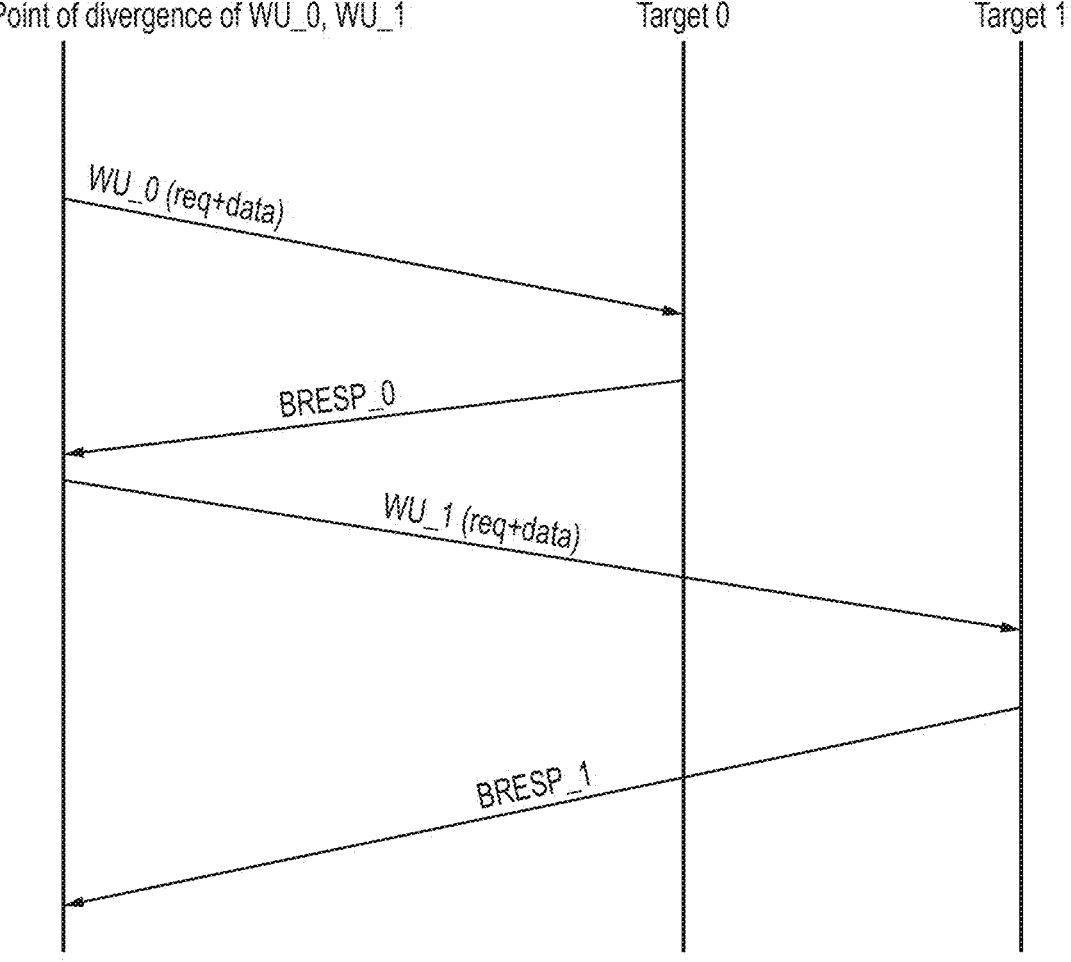
FIG. 4 illustrates, for a comparison, an example of enforcing strong ordering based on serializing write push requests targeting different target nodes.

FIG. 4 shows one comparative technique for enforcing the strong ordering requirement when strongly ordered write push requests are sent to different target nodes. Based on one or more write requests received at an ingress interface 4 from a given strong-order-requiring request source 14, it may be required to transmit a first write push request (WU_0) of an ordered set of requests to a first target node (target 0) and a second write push request (WU_1) of an ordered set of request to a second target node (target 1). With typical interconnect protocols implementing a write push flow, once the initial write push request WU_0, WU_1 has been transmitted specifying write target address information and corresponding write data, there is no way that the transmitting circuit node can control the timing at which the recipient of those write push requests makes the write data visible to other readers. Therefore, the only way the transmitting node sending those write requests can guarantee that a younger request (e.g. WU_1) to one target node (e.g. target 1) will not be observed as completing before an older request (WU_0) to a different target node (e.g. target 0) is to delay sending the younger write push request WU_1 to target 1 until after the completion response (BRESP_0) as being received from target 0 for the older write push request WU_0. This serializes the processing of the write push requests, and means that any delays in handling the older request also cause corresponding delays to the younger request. There is no option of parallelizing at least part of the processing of the younger request with the processing of the older request.

The most recent generations of PCIe (e.g. generations 5, 6 and 7) are increasing the required memory bandwidth to be supported for requests originating from a PCIe source 14, and so the limitation to enforce PCIe ordering requirements based on serialization of write push requests targeting different target nodes may make it extremely challenging to keep up with the bandwidth requirements imposed by such later PCIe generations.

To address this problem, the examples discussed below introduce an unblock request which can be used, by a transmitting node that is transmitting a write push request, to indicate when a downstream receiving node that is receiving the write push request is allowed to allow an unblocking condition to be satisfied so that conflicting read requests which target at least one same address as the write push request can be unblocked and allowed to complete. As an upstream circuit node can then signal to a downstream circuit node, separate from the write push request itself, the timing at which the write data of the write push request is allowed to become visible to readers, this eliminates the requirement for the upstream circuit node to serialize write push requests of a strongly ordered set, such that it becomes possible for a younger write push request to be sent to one target node before a write completion response has been received for an older write push request specifying a different target node. This greatly helps to improve memory throughput for the ordered set of write push requests.

Hence, the interconnect 2 may include at least one unblock-request-transmitting interconnect circuit node capable of transmitting the unblock request to a downstream circuit node, and at least one unblock-request-receiving interconnect circuit node capable of receiving and processing the unblock request from an upstream circuit node. While the unblock-request-transmitting interconnect circuit node could be any interconnect circuit node beyond which write push requests diverge to different target nodes, in the examples below the unblock-request-transmitting interconnect circuit node is an ingress interface 4 of the interconnect 2 at which requests are received from a corresponding strong-order-requiring request source, such as a PCIe source 14. While the unblock-request-receiving interconnect circuit node could be any interconnect circuit node downstream of the point at which write push requests initiated by a strong-order-requiring request source diverge to different target nodes, in the examples discussed below the unblock-request-receiving interconnect circuit node is an egress interface 6. By implementing the unblock request transmitting/receiving functionality at an ingress/egress interface 4, 6 respectively, this simplifies the router components within the interconnect fabric 8.

Figure 5:
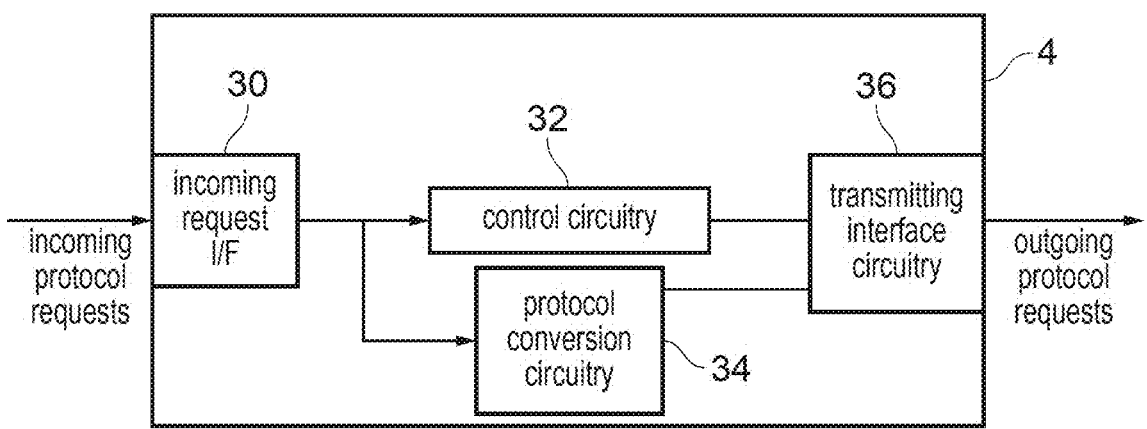
FIG. 5 illustrates an example of an unblock-request-transmitting interconnect circuit node.

FIG. 5 illustrates an example of an unblock-request-transmitting interconnect circuit node 4, which comprises an incoming request interface 30 for receiving incoming requests defined according to an incoming protocol, such as AMBAR AXI for instance. Control circuitry 32 detects the types of incoming requests received, and controls transmitting interface circuitry 36 to transmit corresponding outgoing requests defined according to an outgoing protocol. The outgoing protocol may be the same as the incoming protocol, or could be different to the incoming protocol, and if there is a difference between the incoming and outgoing protocols, then protocol conversion circuitry 34 may be provided to map between the incoming and outgoing protocols. For example, the outgoing protocol may be an internal transport protocol used by the interconnect fabric 8. The outgoing protocol supports the unblock request described above. The control circuitry 32 controls use of that unblock request to enforce strong ordering of write push requests transmitted in response to one or more write requests received on the incoming request interface 30 from a strong-order-requiring request source 14. An ordered set of write push requests transmitted by the transmitting interface circuitry 36 corresponding to a given request source 14 may be generated based on either a single write request received from the request source 14 on the incoming request interface 30 (e.g. with that single request specifying address information which maps to multiple striped targets as shown in FIG. 3), or based on a series of multiple write requests received from the request source 14.

Figure 6:
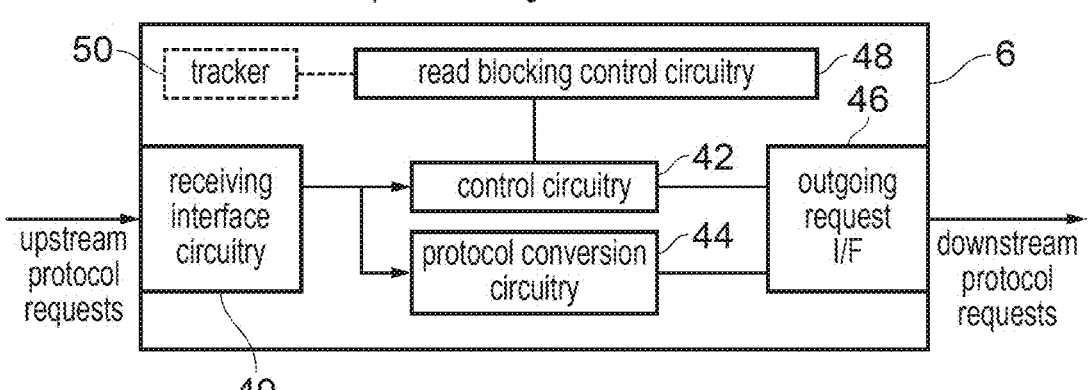
FIG. 6 illustrates an example of an unblock-request-receiving interconnect circuit node.

FIG. 6 illustrates an example of an unblock-request-receiving interconnect circuit node 6, which comprises receiving interface circuitry 40 for receiving upstream requests defined according to an upstream protocol. Control circuitry 42 detects the types of upstream requests received, and controls outgoing interface circuitry 46 to transmit corresponding downstream requests defined according to a downstream protocol. Again, if the downstream protocol differs from the upstream protocol, protocol conversion circuitry 44 controls mapping between the upstream requests and the downstream requests. For example, when the unblock-request-receiving interconnect circuit node is an egress interface 6, then the upstream protocol may be the internal transport protocol used by the interconnect fabric 8 and the downstream protocol could be any protocol used to communicate with a downstream circuit node coupled to the egress interface 6. For example, if the downstream circuit node is an I/O module 14 then a non-coherent on-chip interconnect protocol such as AMBA® AXI could be used as the downstream protocol. If the downstream circuit node is the coherent interconnect 18, then the downstream protocol could be a coherent interconnect protocol such as AMBAR CHI. if the downstream circuit node is a chip-to-chip interface 20, then the downstream protocol could be a chip-to-chip interface protocol such as the AMBA® CHI Chip-to-Chip (C2C) protocol.

The unblock-request-receiving interconnect circuit node 6 also includes read blocking control circuitry 48 for enforcing a requirement that a conflicting read request, which requests a read to one of the one or more addressed locations identified by the write target address information specified by a given write push request, is blocked from completing until an unblocking condition is satisfied for the given write push request. For at least one type of write push request, the read blocking control circuitry 48 ensures that the unblocking condition cannot be satisfied until an unblock request has been received for the given write push request being received by the receiving interface circuitry 40. In some examples, the unblock-request-receiving interconnect circuit node 6 also comprises tracking circuitry 50 for tracking the address information of write push requests which have not yet had the unblocking condition satisfied. Read requests received by the unblock-request-receiving interconnect circuit node 6 may be looked up in the tracking circuitry 50 and the read blocking control circuitry 48 can block those read requests from completing if they conflict with addresses tracked in the tracking circuitry 50, until the corresponding write push request which conflicts with the read has its unblocking condition satisfied (e.g. based on receipt of the unblock request). Other examples may not require the tracking circuitry 50, for instance if the downstream protocol (e.g. AMBA® CHI) supports a completion acknowledgement message in a write pull flow which can be used to ensure that conflicting reads do not observe the effect of a given write until the completion acknowledgment for that write is sent— in that case the read blocking control circuitry 48 may instead use the unblock request to control the timing at which the completion acknowledgement message is sent, rather than maintaining a tracker 50 itself.

Figure 7:
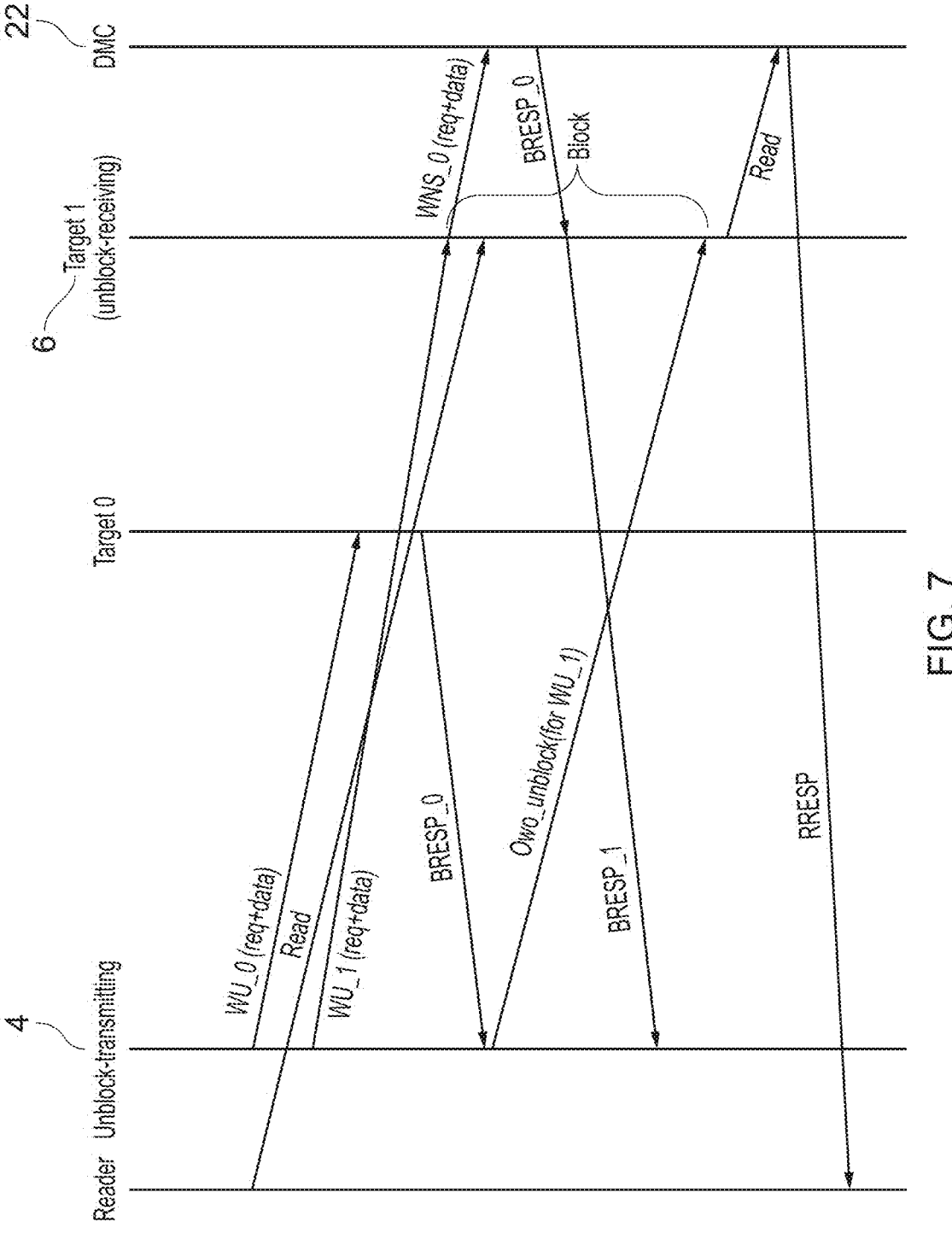
FIGS. 7 and 8 are ladder diagrams illustrating examples of use of an unblock request to enforce ordering for a set of strongly ordered write push requests.

FIG. 7 is a ladder diagram showing how use of the unblock request can help improve performance for ordered write push requests. A given ingress interface 4 coupled to a strong-order-requiring request source (e.g. PCIe source 14) serves as the unblock-request-transmitting interconnect circuit node in this example, and similar to the example of FIG. 4 discussed above, transmits, as part of a strongly ordered set of write push requests, a first write push request WU_0 to a first target node (target 0) and a second, younger, write push request WU_1 to a second target node (target 1). In this example, target 1 acts as the unblock-request-receiving interconnect circuit node, and in particular is an ingress interface 6 coupled to a memory controller 22 which provides access to the memory location corresponding to the address information specified by WU_1. Hence, for this example the target 1 ingress interface 6 acting as unblock-request-receiving interconnect circuit node implements the tracking circuitry 50 for controlling blocking of conflicting read requests. While FIG. 7 (and other examples discussed below) shows a scenario where the conflicting read request, which is blocked at target 1 until WU_1 is unblocked, is received after the write push request WU_1 that causes that read to be blocked, in other examples the conflicting read could have been received before WU_1, and is still blocked from completing until WU_1 is unblocked, if the read is not yet complete at the time when WU_1 is received.

In contrast to FIG. 4, in the approach shown in FIG. 7, the support for the unblock request (labelled owo_unblock) means that the younger write push request WU_1 can be transmitted by the unblock-request-transmitting interconnect circuit node 4 before the write completion response (BRESP_0) has been received from target node 0 in response to the older write push request WU_0. This means that the target node 1 can start processing the write (e.g. initiating corresponding requests to the memory controller 22) even before WU_0 has completed. It also means that any routing delays associated with routing WU_1 from the transmitting node 4 to target 1 can be overlapped with the processing of WU_0 by target 0. Hence, this greatly helps speed up processing of WU_1. However, as there is a risk that a reader component (e.g. another ingress interface 4 coupled to a component such as a coherent interconnect 18 or other request source 16) could issue a conflicting read to the group of memory locations targeted by WU_1 in the period when WU_0 has not yet completed, target 1 acting as unblock-request-receiving interconnect circuit node 6 enforces a requirement that the conflicting read is blocked from completing in a blocking period while an unblocking condition is not yet satisfied for WU_1. As WU_1 is an explicit unblock type of request for which, to allow the unblocking condition to be satisfied, the unblock request is required to be received by the unblock-request-receiving node 6, then this guarantees that the conflicting read from the reader cannot see the updated write data of WU_1 until the unblock request, owo_unblock, is transmitted by unblock-request-transmitting interconnect circuit node 4. As shown in FIG. 7, the unblock-request-transmitting interconnect circuit node 4 delays transmission of the unblock request until the write completion response (BRESP_0) is received from target 0 for WU_0, to ensure that the correct order of observation of the write data of WU_0 and WU_1 imposed by the strong-order-requiring request source 14 is respected.

Hence, with this approach the support for the unblock request means that, even if the strong ordering imposed by a PCIe source 14 or similar strong-order-requiring request source is to be imposed on write push requests striped across multiple target nodes, it is not necessary to delay sending WU_1 while waiting for completion of an older write push request WU_0 to a different target, as the explicit unblock request enables the recipient of WU_1 to enforce the correct ordering by blocking conflicting reads to addresses targeted by WU_1 until the unblock request is received.

In some implementations, all write push requests transmitted by the unblock-request-transmitting interconnect circuit node 4 could be regarded as explicit unblock requests which require a corresponding unblock request to be issued in order for the recipient to enable conflicting reads to be unblocked.

Figure 8:
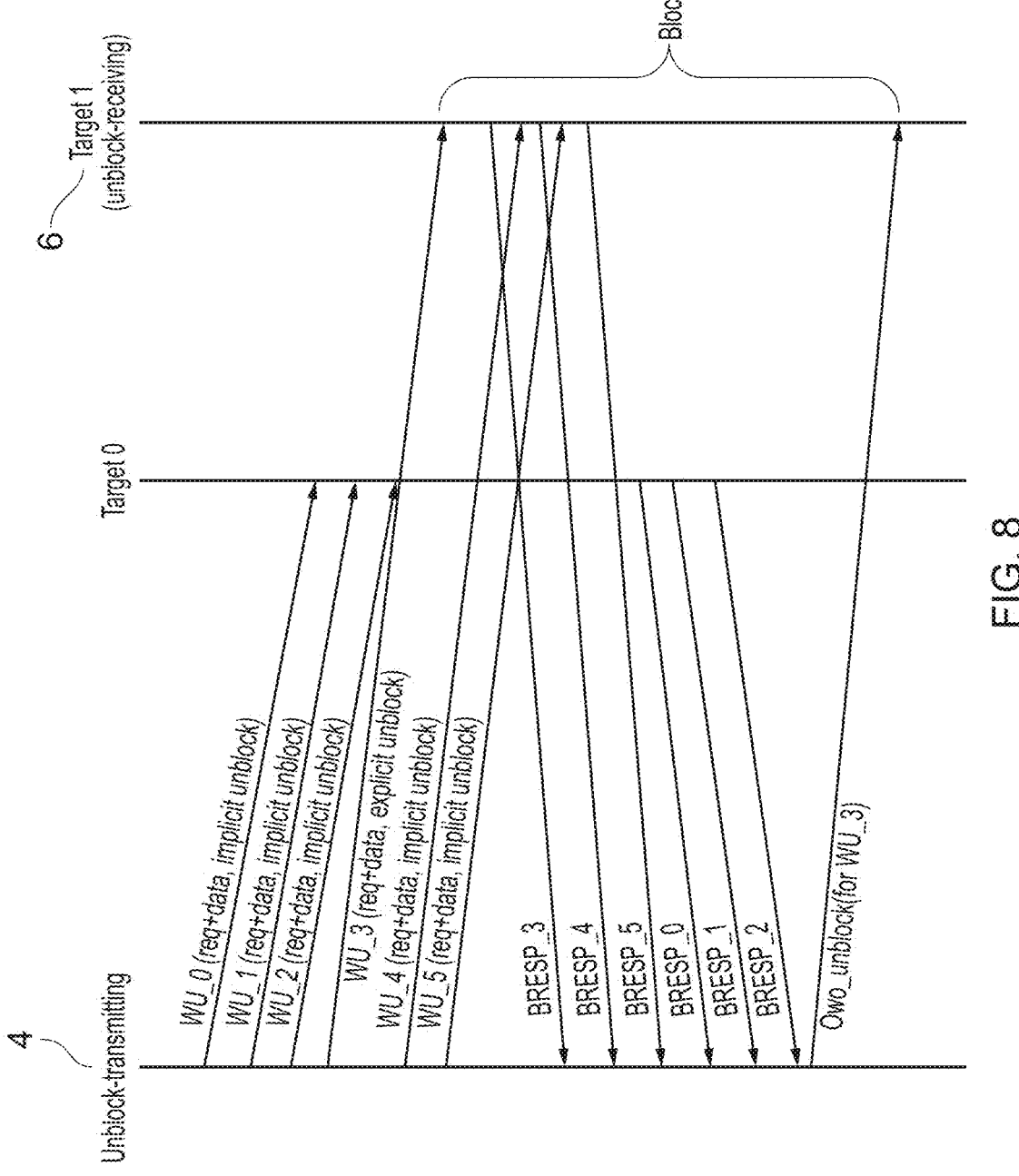

However, as shown in FIG. 8, it may be that, as part of an ordered set of write push requests WU_0 to WU_5 subject to strong ordering due to the requirements of a strong-order-requiring source 14, there are a number of consecutive write push requests (e.g. WU_0 to WU_2 in the example of FIG. 8) which target the same target node (target 0), before a switch to another set of consecutive write push requests (e.g. WU_3 to WU_5 in this example) which target a different target node (target 1). The interconnect protocol supported by interconnect 2 may be such that a transmitting node can assume that any target node receiving multiple write push requests will ensure that those write push requests are observed as being handled in the order they are received (this does not necessarily require those write push requests to actually be processed in that order, but if the recipient reorders the request then it may block conflicting read requests for a period to ensure that no read sees a view of memory that differs from what would have occurred had the write push requests been handled in order). Therefore, an explicit unblock request may not be needed for a younger write push request of the ordered set that follows an older write push request specifying the same target node. The explicit unblock request may be used in cases where the younger write push request specifies a different target node to the target node specified by the preceding older write push request. For other write push requests, an implicit unblock request type may be used which can have its unblocking condition (the condition required to be satisfied before conflicting reads are allowed to complete) satisfied even in absence of receipt of the explicit unblock request.

Hence, with this approach, for the initial write push request WU_0 of the ordered set, and any subsequent write push request WU_1, WU_2, WU_4, WU_5 which targets the same target node as the immediately preceding write push request, these write push requests are transmitted as an implicit unblock request type for which the unblocking condition is allowed to become satisfied regardless of whether an unblock request (owo_unblock) has been received. The explicit unblock request type may be used for write push request WU_3 which targets a different target node compared to the target node targeted by the immediately preceding write push request—e.g. in FIG. 8 WU_3 specifies target node 1 which differs from target node 0 specified by WU_2. Hence, only WU_3 requires the explicit unblock request in this example. This limits the interconnect fabric bandwidth consumed by the unblock requests, and reduces complexity in tracking explicit unblocking at the unblock-request-receiving interconnect circuit node 6 corresponding to target 1.

Nevertheless, the enforcement of ordering between requests targeting the same target node may still require each older write push request received at a given target node to be completed before the unblocking condition can be satisfied for a younger write push request received at that target node. For example, this could be enforced by serializing the processing of the write push requests at the target node, and hence serializing the transmission of the completion responses BRESP for the respective write push requests received at the same target node. Hence, target 0 returns the completion responses in order BRESP_0 to BRESP_2 and target 1 returns the completion responses in order BRESP_3 to BRESP_5. However, as the two target nodes 0, 1 are not in communication with each other, there is no order control between the completion of WU_0 to WU_2 at target 0 and WU_3 to WU_5 at target 1. In this example, WU_3 to WU_5 complete before WU_0 to WU_2, so the BRESP write acknowledgements for WU_3 to WU_5 are received by the unblock-request-transmitting interconnect circuit node 4 before the write completion acknowledgements for WU_0 to WU_2. By supporting the explicit unblock request transmitted for WU_3, then even if WU_3 to WU_5 complete ahead of WU_0 to WU_2, until the unblock request (owo_unblock) is transmitted for WU_3 as a response to the completion message BRESP_2 being received for older write push request WU_2, the unblock-request-receiving node 6 enforces the block on a conflicting reader seeing the write data for write push request WU_3 (and also the subsequent write push requests WU_4 and WU_5 which cannot satisfy their unblocking condition until the older write push request WU_3 also satisfies its unblocking condition), preventing conflicting reads from seeing the effects of WU_3 to WU_5 before WU_0 to WU_2.

Figure 9:
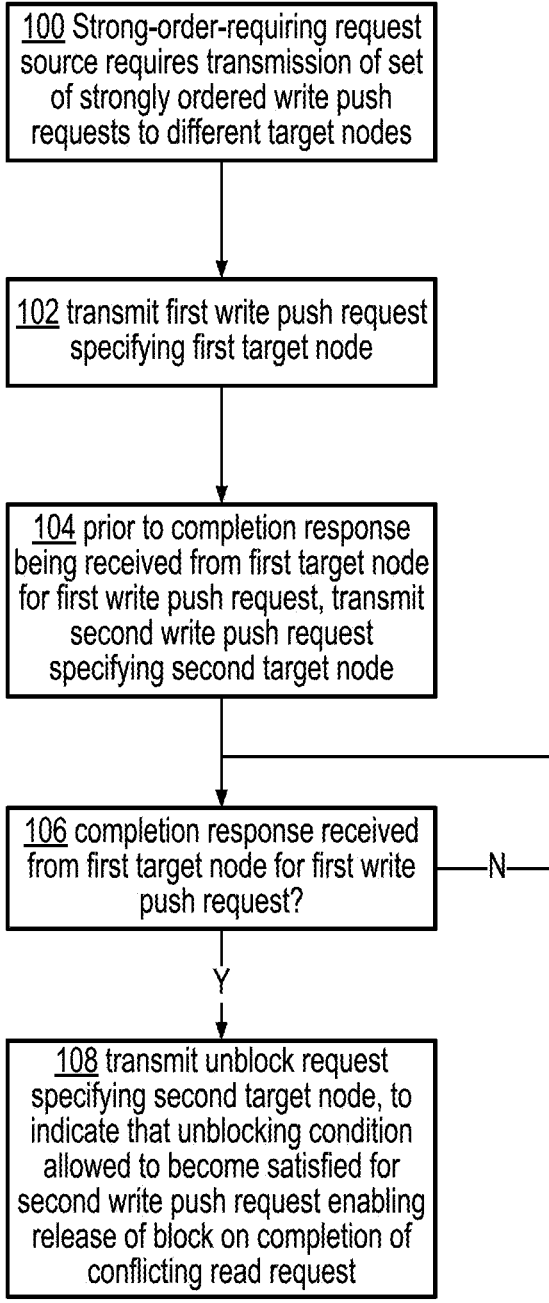
FIG. 9 illustrates steps for controlling transmission of an unblock request.

FIG. 9 illustrates an example of steps performed by the unblock-request-transmitting interconnect circuit node 4. At step 100, the incoming request interface 30 receives at least one request from a strong-order-requiring request source 14 requiring transmission of a set of strongly ordered write push requests including at least two write push requests specifying different target nodes to which those write push requests should be delivered. The target nodes required for the write push requests are determined by the control circuitry 32 based on address information specified by the incoming request(s) from the request source 14 and memory map information indicative of mapping between addresses and target node identifiers (e.g. the memory map information may indicate the pattern of address striping within the memory address space as shown in FIG. 3).

At step 102, the control circuitry 32 controls the transmitting interface circuitry 36 to transmit a first write push request specifying a first target node onto the interconnect fabric 8. The interconnect fabric 8 is responsible for controlling routing so that the first write push request is delivered to the first target node (which may for example be an egress interface 6).

At step 104, prior to a completion response being received from the first target node for the first write push request, the control circuitry 32 controls the transmitting interface circuitry 36 to transmit a second write push request specifying a second target node.

At step 106, the control circuitry 32 checks whether any completion response has been received from the first target node for the first write push request. If not, the control circuitry 32 continues to wait for the completion response.

Once the completion response is received for the first write push request, at step 108 the control circuitry 32 controls the transmitting interface circuitry 36 to transmit an unblock request specifying the second target node. The unblock request indicates that the unblocking condition is allowed to become satisfied for the second write push request, to enable release of a block on completion of any conflicting read requests which specify address information corresponding to a same memory system location as is written to by the second write push request.

FIG. 10 illustrates a more detailed example of the unblock-request-transmitting interconnect circuit node 4 controlling transmission of a set of strongly ordered write push requests, in an example supporting both the implicit unblock type and explicit unblock type of write push request.

At step 120 (similar to step 100 of FIG. 9), the incoming request interface 30 receives at least one request from a strong-order-requiring request source 14 requiring transmission of a set of strongly ordered write push requests including at least two write push requests specifying different target nodes.

At step 122, the control circuitry 32 controls the transmitting interface circuitry 36 to transmit the initial write push request of the set as an implicit unblock type of write push request.

At step 124, the control circuitry 32 determines whether the next write push request to be issued in the strongly ordered set of requests specifies the same target node as the preceding write push request of the set. If the target node for the next write push request is the same as for the preceding write push request, then at step 126 the control circuitry 32 controls the transmitting interface circuitry 36 to transmit the next write push request as the implicit unblock type of write push request, which does not require an explicit unblock request to be sent. If the target node of the next write push request is different from the target node of the preceding write push request, then at step 128 the control circuitry 32 controls the transmitting interface circuitry 36 to transmit the next write push request as the explicit unblock type of write push request, which does require transmission of a corresponding unblock request before the unblocking condition can be considered satisfied at a downstream node.

At step 130, the control circuitry 32 determines whether transmission of the entire set of strongly ordered write push requests is complete, and if not the method returns to step 124 to consider the next write push request in the set. Once the entire set of strongly ordered write push request is complete then at step 132, the control circuitry 32 can proceed with handling other incoming requests received at the incoming request interface 30.

FIG. 11 illustrates steps for determining when to transmit the unblock request following transmission of an explicit unblock type of write push request. At step 140 the control circuitry 32 controls the transmitting interface circuitry 36 to transmit a given explicit unblock type of write push request to a corresponding target node. At step 142, control circuitry 32 determines whether completion responses have been received for all older write push request in the set of strongly ordered write push requests comprising the given explicit unblock type of write push request. If not, then control circuitry 32 continues to wait for confirmation that completion responses have been received for all the older write push requests. Once that confirmation has been obtained, then at step 144 the control circuitry 32 controls the transmitting interface circuitry 36 to transmit the unblock request for the given explicit unblock type of write push request.

Figure 12:
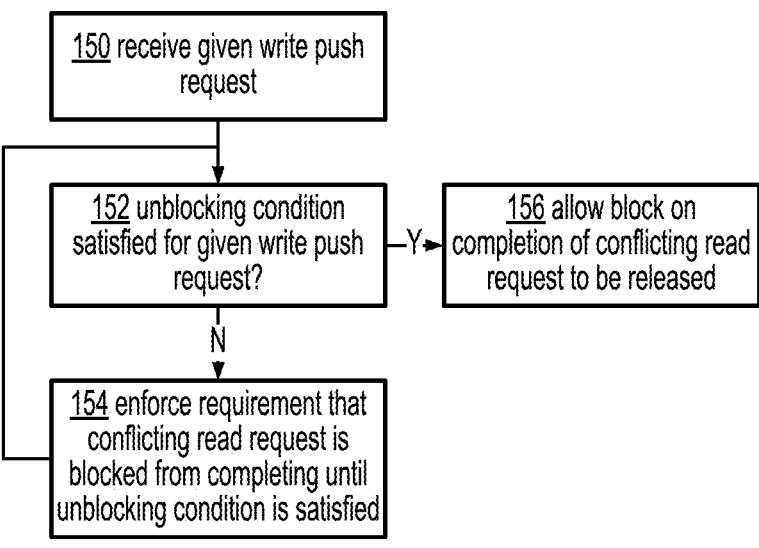
FIG. 12 illustrates blocking of conflicting read requests when an unblocking condition is not yet satisfied for a given write push request.

FIG. 12 illustrates steps performed by an unblock-request-receiving interconnect circuit node 6 for handling a given write push request. At step 150 the receiving interface circuitry 40 receives the given write push request from the interconnect fabric 8. At step 152, the control circuitry 42 determines whether the unblocking condition is satisfied for the given write push request. If not, then at step 154 the read blocking control circuitry 48 enforces a requirement that any conflicting read request is blocked from completing until the unblocking condition is satisfied for the given write push request. A conflicting read request is a read request specifying address information which corresponds to at least one memory system location which also corresponds to address information specified by the given write push request. Once the unblocking condition is determined to be satisfied for the given write push request, then at step 156 the block on completion of conflicting read requests can be released.

Figure 13:
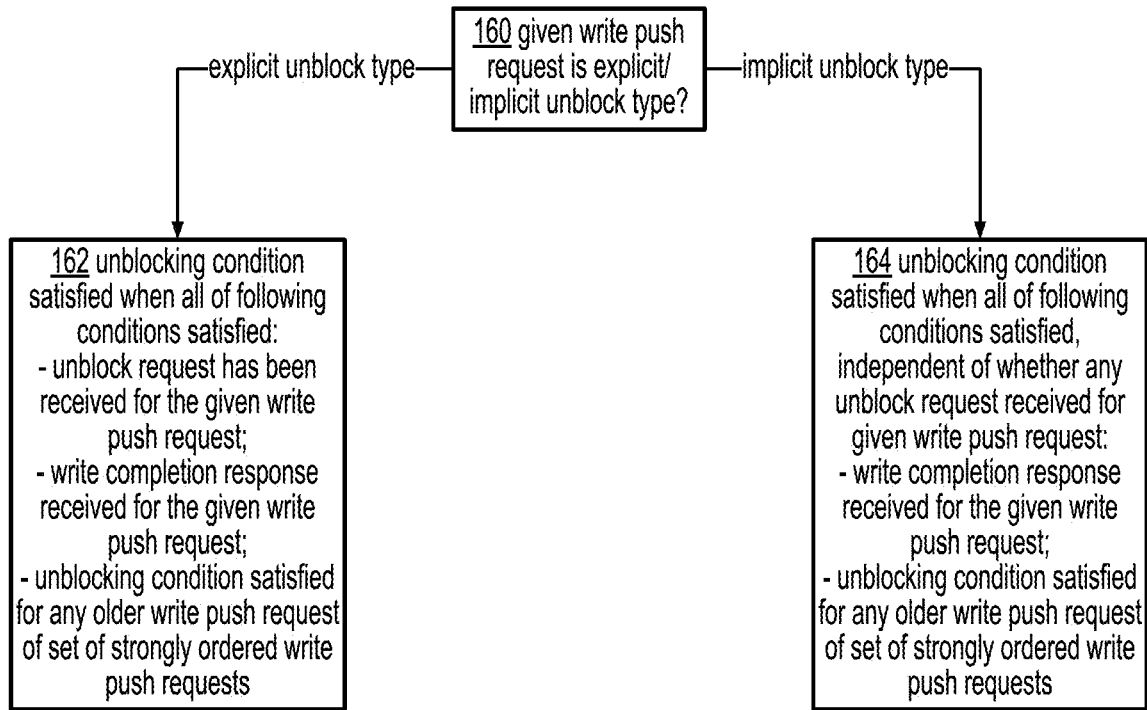
FIG. 13 illustrates determination of whether the unblocking condition is satisfied.

FIG. 13 illustrates steps for determining whether the unblocking condition is satisfied for a given write push request received at an unblock-request-receiving interconnect circuit node 6. At step 160, the control circuitry 42 determines whether the given write push request is the explicit or implicit unblock type of request. If the request is the explicit unblock type of write push request, then at step 162 the unblocking condition is determined to be satisfied when all of the following conditions are satisfied (these conditions may be resolved as satisfied in any order):

an unblock request has been received (from the interconnect fabric 8) for the given write push request;
  a write completion response has been received for the given write push request (e.g. received from a downstream circuit node that was sent a write request corresponding to the given write push request); and
  the unblocking condition has been satisfied for any older write push request of the set of strongly ordered write push requests received at the unblock-request-receiving interconnect circuit node 6.

On the other hand, if the request is the implicit unblock type of write push request, then at step 164 the unblocking condition is determined to be satisfied when both of the following conditions are satisfied (these conditions may be resolved in either order), regardless of whether any unblock request has been received for the given write push request:

a write completion response has been received for the given write push request; and.
  the unblocking condition has been satisfied for any older write push request of the set of strongly ordered write push requests received at the unblock-request-receiving interconnect circuit node 6.

Figure 14:
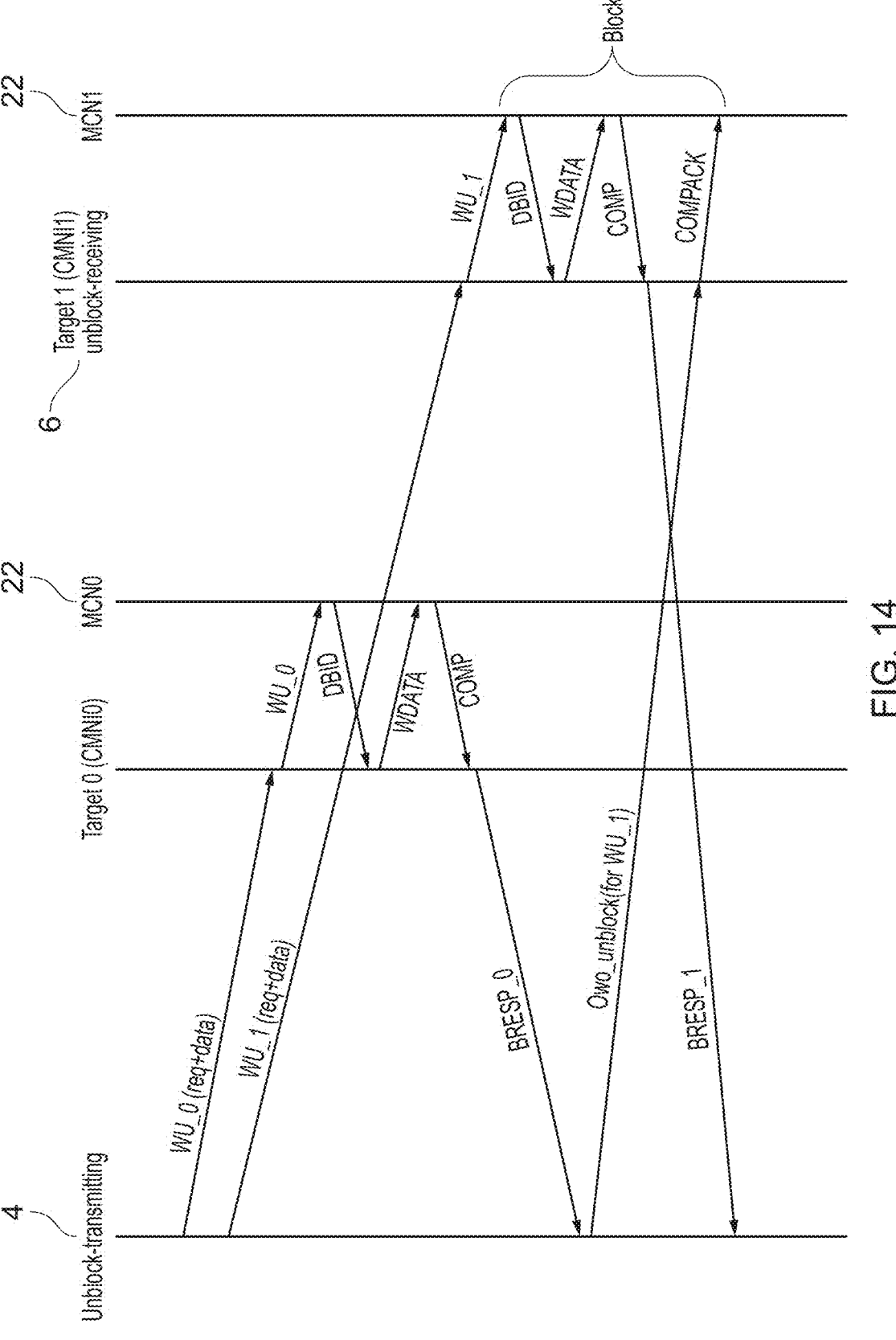
FIG. 14 illustrates an example in which the unblock-request-receiving interconnect circuit node delays a timing of transmitting a write completion acknowledgement until the unblocking condition is satisfied.

FIG. 14 shows an another example scenario where the unblock request can be used. In this use case example, the unblock-request-transmitting node is an ingress interface 4 in communication with a PCIe request source 4, and again requires transmission of write push requests WU_0, WU_1 specifying different target nodes, with the unblock-request-transmitting node 4 managing transmission of the write push requests WU_0, WU_1 and unblock request (owo_unblock) in the same way as discussed above for FIG. 7, with WU_1 transmitted before the completion response BRESP_0 is received for WU_0, and the unblock request transmitted in response to receipt of the completion response BRESP_0 for WU_0.

However, in this example the target node 0 specified by WU_0 is a first coherent interconnect interface CMNI0 of the interconnect 2 and the target node 1 specified by WU_1 is an egress interface 6 which is a second coherent interconnect interface CMNI1 of the interconnect 2. CMNI0 and CMNI1 may communicate with respective interfaces of the coherent interconnect 18 (or with different coherent interconnects 18 entirely). The write requests are ultimately routed via the coherent interconnect(s) 18 to respective memory controller nodes 22, MCN0 and MCN1 respectively.

Each coherent interconnect 18 in this example handles write transactions according to a write pull flow, in which the initial write request WU_0, WU_1 sent from CMNI0, CMNI1 to MCN0, MCN1 does not itself specify the write target data, and the write target data follows later in a separate communication WDATA after the target node MCN0, MCN1 has responded to the write pull request WU_0, WU_1 with a write pull acknowledgement DBID which specifies a buffer ID which can be associated with the subsequent write data communication WDATA. Hence, the recipient of the write data is in control of the timing at which the write data is sent, so can avoid sending the DBID response if it does not have buffer capacity for accepting the write data. The memory controller node MCN0, MCN1 responds to the write data WDATA with a write completion response, COMP. For write pull flows where ordering control between requests to different targets is required, a completion acknowledgement, COMPACK, message may be sent back to the completing node (MCN1 in this example) as a response to the write completion response COMP, to indicate that any requirement to block conflicting reads from completing can be removed.

Hence, with this use case, the unblock-request-receiving node 6 may be the egress port/coherent interconnect interface 6, CMNI 1, which corresponds to the coherent interconnect that will communicate with the memory controller node MCN1 which is to service the write for WU_1. Hence, unblock-request-receiving node (CMNI1) 6 acts as an interface implementing protocol conversion between the non-coherent interconnect transport protocol used between the unblock-request-transmitting node 4 and unblock-request-receiving node (CMNI1) 6, and the coherent interconnect protocol used by coherent interconnect 18 between CMNI1 6 and the corresponding memory controller node (MCN1) 22. The write push requests WU_0, WU_1 sent on the non-coherent interconnect 2 are mapped by the protocol conversion circuitry 44 of CMNI0, CMNI1 to write pull requests WU_0, WU_1 sent over the coherent interconnect 18. The corresponding write completion responses, COMP, for a write pull request in the coherent interconnect protocol is mapped back to write completion responses BRESP_0, BRESP_1 in the non-coherent interconnect protocol. Receipt of BRESP_0 triggers the unblock-request-transmitting node 4 to send the unblock request as in the example of FIG. 7. The unblock-request-receiving node 6 is CMNI1, and in response to the unblock request, maps this to a corresponding completion acknowledgement COMPACK. The timing of transmission of the completion acknowledgment is dependent on receipt of the unblock request (as WU_1 is indicated to CMNI1 as being the explicit unblock type). Hence, if CMNI1 6 receives the COMP write completion response from MCN1, but has not yet received the unblock request from the unblock-request-transmitting node 4, then transmission of COMPACK to MCN1 22 is delayed until the unblock request has been received. MCN1 prevents conflicting reads from being completed until the COMPACK message is received.

Hence, with this approach the unblock-request-receiving node 6 enforces the block on completion of conflicting reads by delaying the timing of transmission of the COMPACK message to MCN1 until the unblock request has been received, rather than maintaining a tracking structure 50 for tracking unblock conditions for the write request itself. Such a tracking structure 50 may instead be maintained at the downstream node (MCN1). Hence, it is not essential for the node 6 which receives the unblock request according to the write push flow to also be the node that actually tracks addresses for which conflicting read requests should be blocked.

The above examples show a scenario involving a single ingress interface 4 which receives requests from a strong-order-requiring request source 14. However, it is also possible that a given interconnect 2 may have two or more ingress interfaces 4 each receiving requests from the respective strong-order-requiring request source 14. In this case, as shown in FIG. 15, if no deadlock mitigation measures are implemented, there could be a risk of deadlock where each strong-order-requiring request source 14 issues one or more requests requiring a set of strongly ordered write push requests to be issued on the interconnect, but neither set of strongly ordered write push request can make forward progress because each is waiting for an event which requires progress to be made on the other set.

Figure 15:
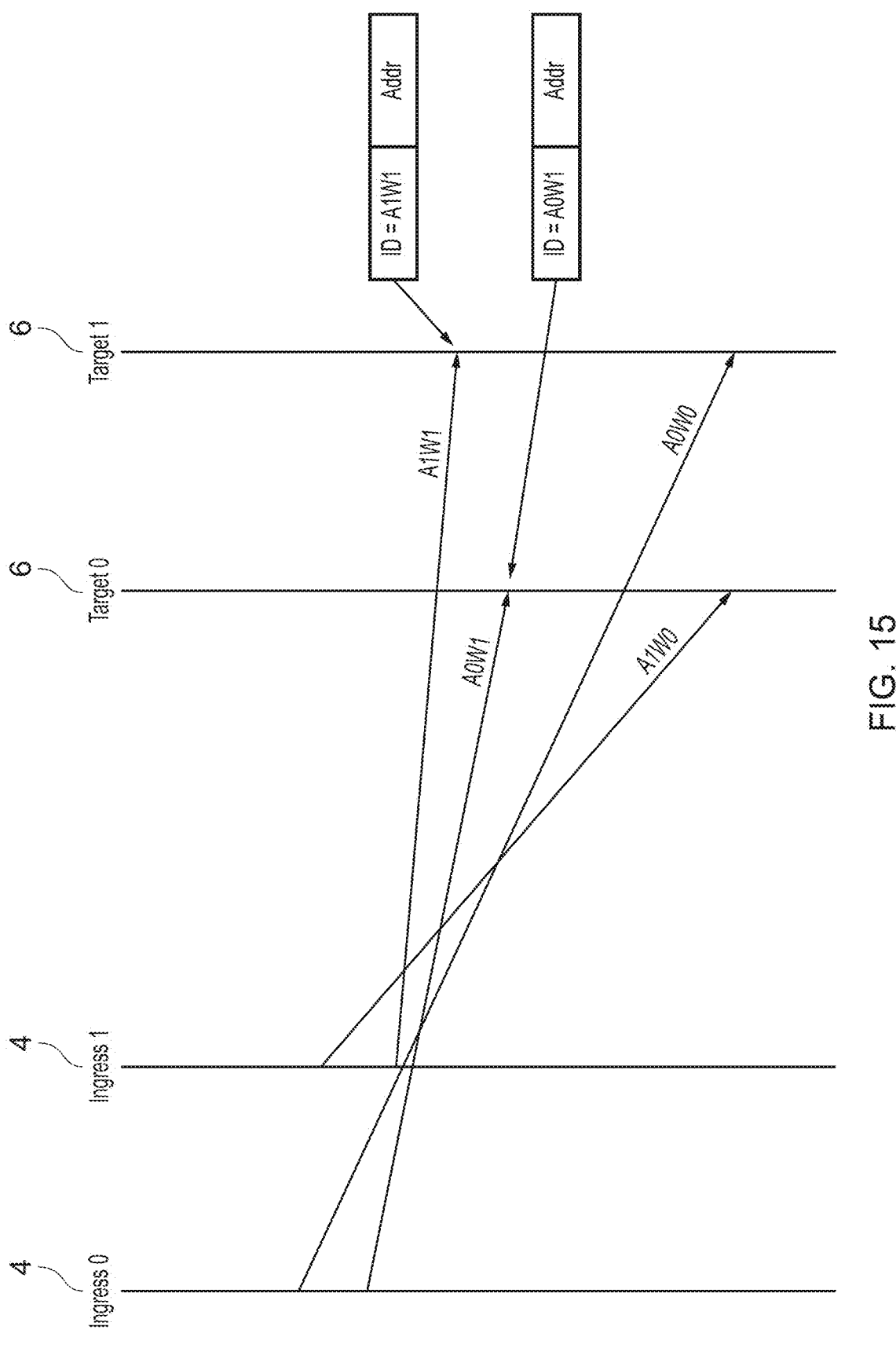
FIG. 15 illustrates a scenario in which deadlock could arise if no deadlock-mitigating measure is implemented.

FIG. 15 illustrates an example of such a deadlock scenario. In this example it is assumed that a first ingress interface 4, ingress 0, receives a request from a corresponding strong-order-requiring request source 14 that requires transmission of a set of strongly ordered write push requests A0W0 and A0W1, where A0W0 is the older request that is to be observed as completing before the younger requester A0W1. Of these requests, A0W0 specifies target node 1 (e.g. an egress interface 6) and A0W1 specifies target node 0 (e.g. another egress interface 6). Similarly, a second ingress interface 4, ingress 1, receives a request from a corresponding strong-order-requiring request source 14 that requires transmission of a set of strongly ordered write push requests A1W0 and A1W1, where A1W0 is the older request that is to be observed as completing before the younger requester A1W1. Request A1W0 specifies target node 0 and request A1W1 specifies target node 1. Hence, the required order of observed completion at the target nodes is different for the two sets of strongly ordered requests, in that for the requests issued by ingress 0 the older request A0W0 is to target node 1 and the younger request A0W1 is to target 0, while for the requests issued by ingress 1 the older request A1W0 is to target 0 and the younger request is to target 1.

Consider an implementation where each target node is an egress interface 6 having the tracking circuitry 50 for tracking identifiers and addresses of pending write push requests, to allow for conflicting reads looked up in the tracker to be blocked until the write push request satisfies its unblocking condition. For ease of explanation, assume that the tracking circuitry 50 at each egress interface 6 has only a single tracking entry, and so can only track one write push request at a time.

As shown in FIG. 15, although the required order of observation of completion of write push requests within each set is in the order {A0W0, A0W1} and {A1W0, A1W1}, variable routing delays in the interconnect fabric 8 (e.g. due to different physical distances between the ingress interfaces 4 and target nodes 6) could result in the requests being received at the target nodes 0 and 1 in a different order. Hence, it is possible that, at target 0, the first request that arrives is A0W1, which is allocated the only available tracking entry, preventing the oldest request A1W0 of the other set of strongly ordered requests acquiring a tracking entry at target 0, and hence blocking the oldest request A1W0 issued by ingress 1 from making forward progress until A0W1 can be unblocked. However, A0W1 cannot be unblocked until the older request A0W0 from ingress 0 makes forward progress, but A0W0 may similarly be blocked because it arrived at target 1 after the younger request A1W1 of the set of write push requests issued by ingress 1. Hence, in this scenario, a deadlock would arise preventing either set of write push request making forward progress.

FIGS. 16 to 19 illustrate techniques for mitigating against such deadlock scenarios.

Figure 16:
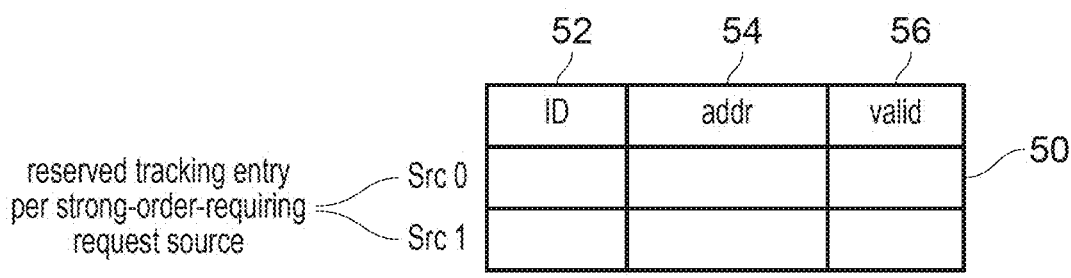
FIG. 16 illustrates an example of tracking circuitry.

As shown in FIG. 16, the tracking circuitry 50 at an unblock-request-receiving interconnect circuit node 6 may have a number of tracking entries 50 each specifying information for corresponding write push request, such as an identifier 52 of the write push request, address information 54 identifying one or more memory system locations targeted by the write push request, and valid information 56 indicating whether this entry is valid. A tracking entry may be invalidated when the corresponding write push request's unblocking condition becomes satisfied, and indicated as valid when a new entry is allocated for an incoming write push request. When looking up the tracker 50 for a given read request, the given read request is blocked from completing if its address information corresponds to any address indicated by the address information 54 of an entry of the tracker 50 indicated as valid by the valid information 56. A given entry may be invalidated when the conditions discussed above for FIG. 13 are satisfied, with the identifier 52 of the given entry used to identify correspondence between a given unblock request and the corresponding tracking entry.

As shown in FIG. 16, to reduce risk of deadlock, the tracking circuitry 50 may have at least one reserved tracking entry per strong-order-requiring request source 14. Hence, in the scenario shown in FIG. 15, there could be one tracking entry reserved for requests from ingress 0 and another tracking entry reserved for requests from ingress 1. This ensures that each strong-order-requiring request source can always have at least one tracking entry available to accept a write push request, so that it is not possible for the limited number of tracking entries to cause mutual blocking between two sets of strongly ordered write push requests initiated based on requests from different strong-order-requiring request sources. Although FIG. 16 shows just the reserved tracking entries corresponding to each strong-order-requiring request source 14, it will be appreciated that the tracking circuitry 50 could also have at least one general purpose tracking entry which can be used for requests from any request source.

Even if the tracking circuitry 50 is protected against causing deadlock, another risk of deadlock may arise if two sets of strongly ordered write push requests are each blocked because their oldest outstanding request is blocked in the interconnect fabric 8 behind a younger request from another set of strongly ordered write push requests. This could arise, for example, if the two sets of strongly ordered write push requests compete for interconnect bandwidth (e.g. capacity in a buffer at a given interconnect node such as an interconnect router 60, or communication bandwidth on a communication channel).

Figure 17:
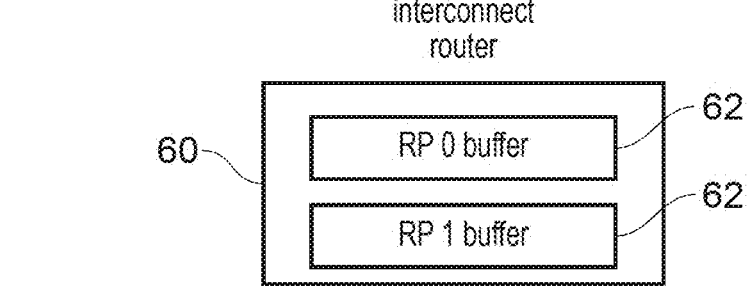
FIG. 17 illustrates use of separate resource planes for transactions corresponding to different strong-order-requiring request sources.

FIG. 17 illustrates a first technique for protecting against deadlock in the interconnect fabric 8. The interconnect fabric 8 may support multiple resource planes 62 which provide separate hardware resources for communication of requests on a communication channel. For example, as shown in FIG. 17, a given interconnect router 60 may have separate buffers 62 reserved per resource plane, to ensure that communication packets allocated to one resource plane cannot cause blocking of communication packets allocated to a different resource plane. When transmitting the write push requests for a given set of strongly ordered write push requests, the write push requests for different strong-orderrequiring request sources 14 can be allocated to different resource planes to ensure that they do not block each other. For example, in the scenario shown in FIG. 15, ingress 0 could allocate its write push requests to resource plane 0 and ingress 1 could allocate its write push request to resource plane 1.

Figure 18:
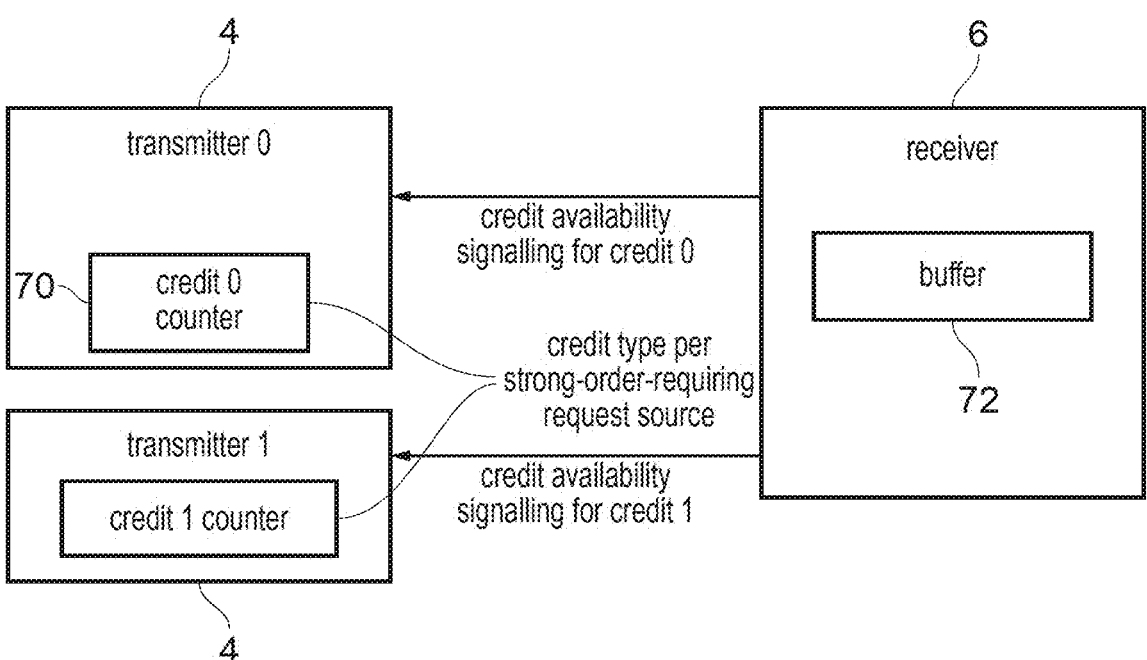
FIG. 18 illustrates use of separate credit schemes for requests corresponding to different strong-order-requiring request sources.

FIG. 18 illustrates a second technique for protecting against deadlock in the interconnect fabric 8, based on a credit mechanism to manage utilisation of shared communication link bandwidth. In this example, it is not essential to reserve separate hardware resources as in FIG. 17, but instead availability of shared resource (e.g. shared buffer capacity 72 at a receiving node such as the egress interface 6) can be signalled from the receiving node to a transmitting node (e.g. the ingress interface 6), by issuing credits. Transmitting nodes 4 may maintain separate credit counters 70 for multiple types of credits. For example, a first transmitting node 4 corresponding to a first strong-order-requiring request source may maintain a first credit counter 70 for credit type 0 and a second transmitting node 4 corresponding to a second strong-order-requiring request source may maintain a second credit counter 70 for credit type 1. Each counter 70 indicates a number of credits available for a corresponding type of credit. For each credit type, the credit counter 70 is decremented when a request is transmitted based on availability of a credit of that type, and the credit counter 70 is incremented when a receiving node 6 signals to indicate that there is available buffer capacity for receiving another request (e.g. the receiving node 6 can indicate that another credit is available when a corresponding request is completed by the receiving node 6). Each strong-order-requiring request source may have transmission of its write push requests managed according to a different type of credit (managed based on a different credit counter 70). With this approach, the credit availability can be managed by the receiver 6 to ensure that the total number of credits available in each credit type 70 is no greater than the capacity of its receiving buffer 72. Hence, the credit scheme may guarantee some available bandwidth for accepting a request from each credit group at any given time, to avoid risk of requests allocated to one credit group blocking requests from another credit group indefinitely. Hence, by controlling the transmission of the requests corresponding to each strong-order-requiring request source 14 according to a different set of credits, risk of deadlock can be reduced.

Figure 19:
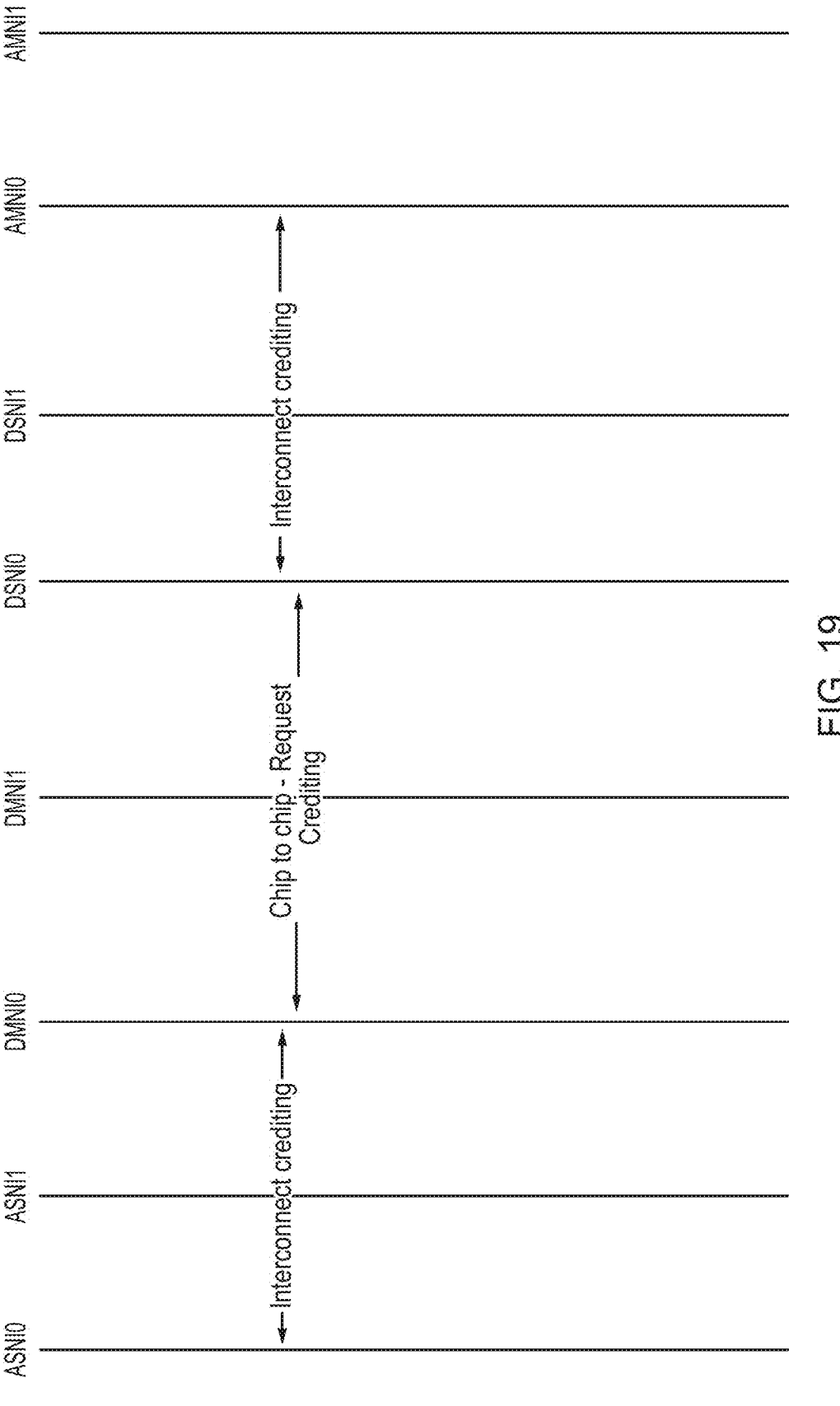
FIG. 19 illustrates end-to-end use of crediting when routing across multiple different communication links.

As shown in FIG. 19, if the requests initiated by a given strong-order-requiring request source 14 are to pass through a number of changes in protocol, e.g. with interfaces between non-coherent and/or coherent interconnects 2, 18 and/or chip-to-chip links, then end-to-end credit schemes may be used to ensure that each communication link has its own credit scheme to manage the availability of bandwidth on that communication link. For example, FIG. 19 shows an example of two interconnects separated by a chip-to-chip link, and credit schemes similar to that of FIG. 18 may be implemented on each interconnect and on the chip-to-chip link to provide some guarantee of availability to receive requests for each strong-order-requiring request source.

Figure 20:
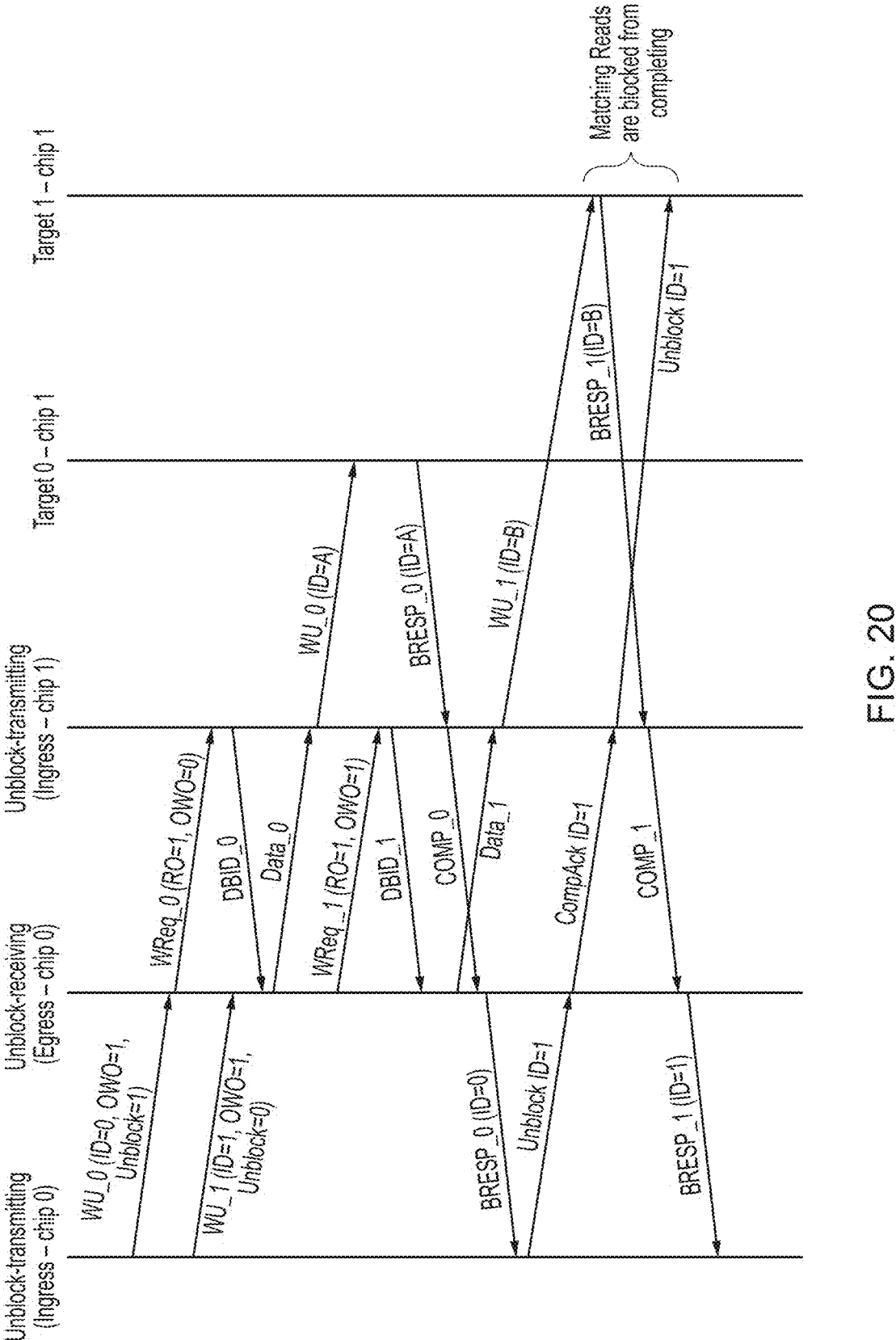
FIG. 20 illustrates a further example of use of the unblock request in a multi-chip system.

As shown in FIG. 20, the use of the unblock request can also work in a multi-chip system, where the ultimate target nodes which are to process strongly ordered write push requests are in a different chip to the ingress node 4 coupled to the PCIe source 14 that initiated the strongly ordered write push requests. Hence, the set of strongly ordered write push requests WU_0, WU_1 are sent from an unblock-transmitting node on chip 0 to an egress port 6 at which the requests are mapped to a protocol used on the chip-to-chip interface between that egress port 6 and an ingress port 4 for chip 1. The chip-to-chip interface protocol can be similar to the coherent interconnect protocol in the example of FIG. 14, in using a write pull flow for its write requests, and so at the egress node 6 on chip 0, the write push requests are mapped to write pull requests (with the unblock request for write WU_1 being mapped to the completion acknowledgement on the chip-to-chip interface, similar to the example of FIG. 14). At the ingress node 4 on chip 1, the write data for the write pull request is mapped back to a write push request, the write completion response (BRESP) returned for the write push request is mapped to a write completion response (COMP) sent over the chip-to-chip link, and the completion acknowledgement (CompAck) received on the chip-to-chip link is mapped to a further unblock request (Unblock) transmitted across the interconnect on chip 1 to its eventual definition. A target node 1 on chip 1 implements blocking of conflicting reads while the unblocking condition is satisfied for write WU_1, with the unblock request triggering the unblocking condition becoming satisfied as for the previous examples.

Hence, in this example, the unblock request originates from a source ingress interface 4 on chip 0, is converted to a completion acknowledgement on the chip-to-chip link, and then is converted back to an unblock request at the ingress interface 4 of the interconnect on chip 1. Hence, the ingress interface 4 on chip 1 could itself be regarded as a further unblock-transmitting request node, and for that ingress interface 4 on chip 1, the corresponding strong-order-requiring request source may be regarded as chip 0 which is coupled to ingress interface 4 on chip 1 via the chip-to-chip link.

Hence, this demonstrates that the unblock request is usable also in a multi-chip scenario.

Figure 21:
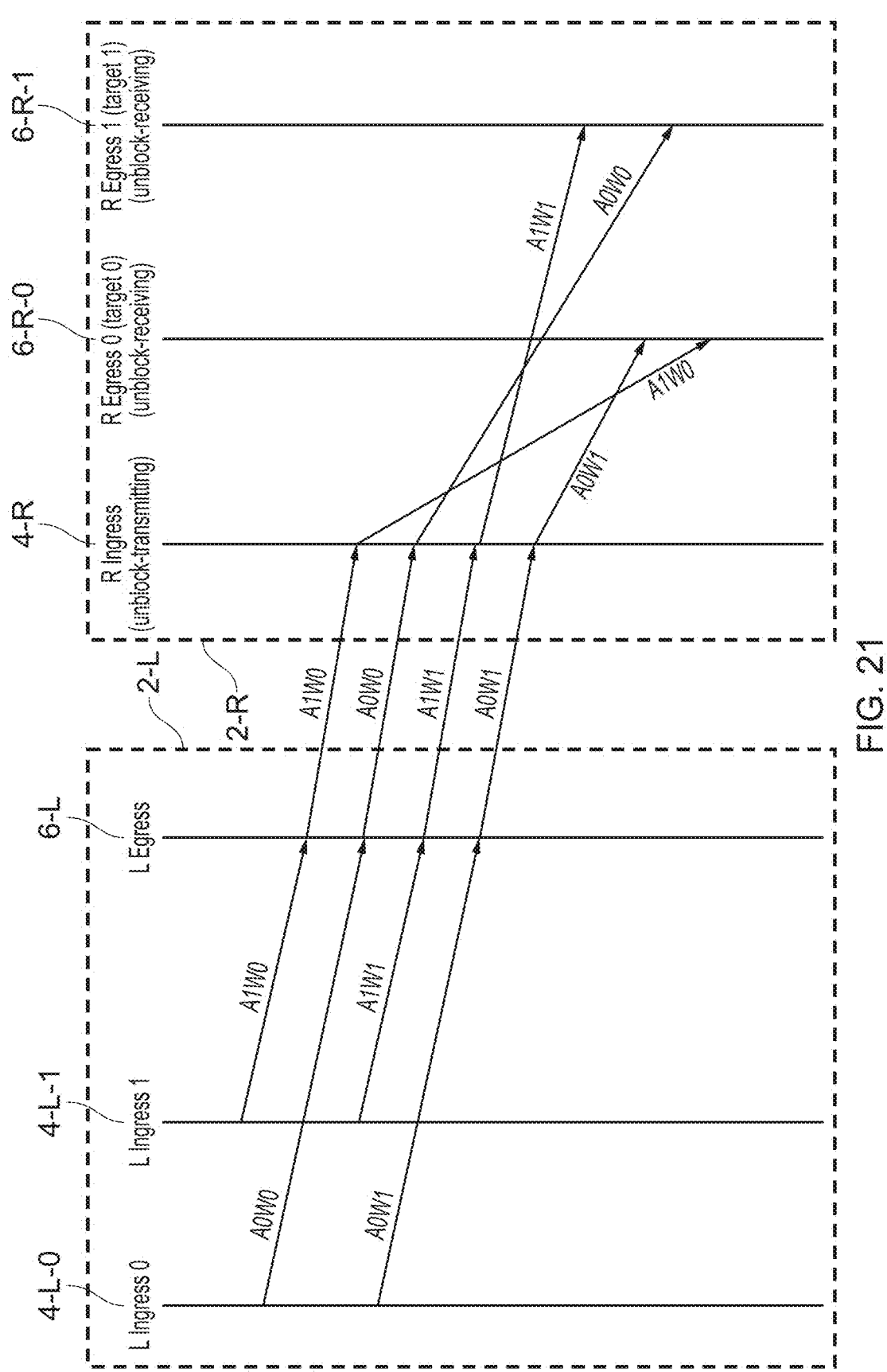
FIG. 21 illustrates an example of enforcing strong ordering within one network-on-chip based on requests originating from another network-on-chip.

Similarly, the unblock request can also be used in a system comprising multiple connected network-on-chips (interconnects 2) as in the example of FIG. 21. In this example, the left-hand interconnect 2-L has two ingress interfaces 4-L-0, 4-L-1, which each initiate respective sets of strongly ordered write push requests based on requests from corresponding PCIe sources 14, but there is no address striping of these requests across different target nodes in the left-hand interconnect 2-L and so all the requests target the same egress node 6-L. The requests all arrive at an ingress interface 4-R in the right-hand interconnect 2-R, and are then striped across multiple targets 6-R-0, 6-R-1 respectively. The right-hand interconnect 2-R handles these requests in the same way as in earlier examples, e.g. as in FIG. 7. Hence, from the point of view of the ingress 4-R in the right-hand interconnect 2-R, the strong-order-requiring request source is the left-hand interconnect 2-L.

Figure 22:
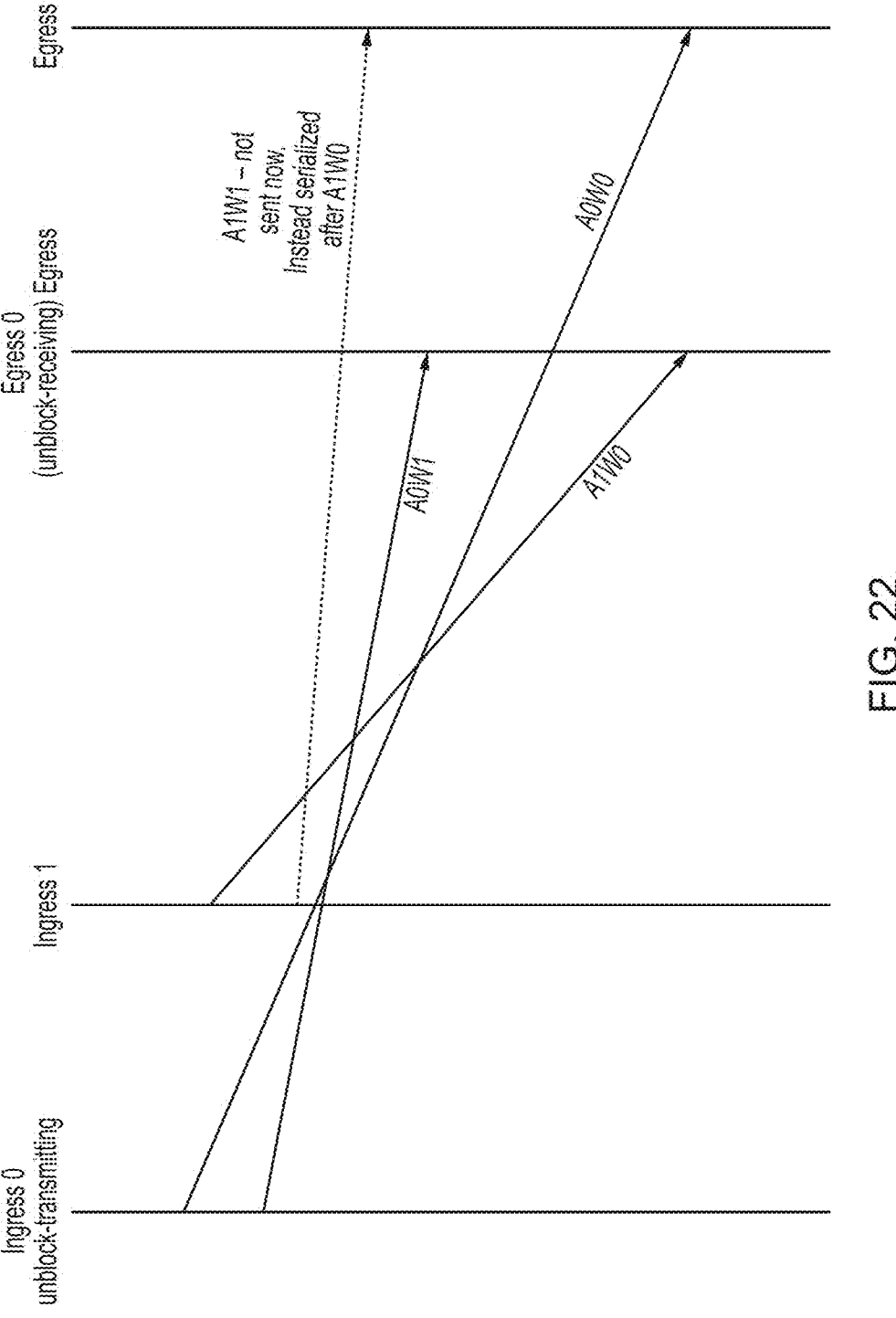
FIG. 22 illustrates an example where different nodes of an integrated circuit use different techniques for enforcing strong ordering of write push requests.

As shown in FIG. 22, it is not essential for all ingress interfaces 4 coupled to strong-order-requiring request sources 14 to support the unblock request. In some use cases, some strong-order-requiring request sources 14 may have a higher bandwidth requirement than other strong-order-requiring request sources 14 (e.g. one PCIe source 14 might use one of the earlier generation versions of the PCIe protocol, which has a lower bandwidth requirement). For the lower bandwidth sources, it may be acceptable to have write requests serialized as shown in FIG. 4, and so the ingress interfaces 4 for such sources can avoid sending a younger request A1W1 before the older request A1W0 is complete, and therefore do not need to support the unblock request. The support for the unblock request to enable a younger request A0W1 to be issued before an older request A0W0 is complete may be limited to those ingress interfaces (e.g.

ingress 0 in FIG. 22) which are associated with a request source with a higher bandwidth requirement. Hence, in the example of FIG. 22, for ingress 1 which has the lower bandwidth requirement, rather than sending request A1W1 at the timing shown in the dotted line, request A1W1 can instead be deferred until after A1W0 completes. Nevertheless, ingress 0 can accelerate the processing of requests A0W0, A0W1 by issuing write push request A0W1 before A0W0 completes, and use the unblock request to indicate to egress 0 (the target of A0W1) when any conflicting reads can be unblocked (the unblock request being issued in response to completion of A0W0 by its target node, i.e. egress 1 in this example).

Concepts described herein may be embodied in a system comprising at least one packaged chip. The unblock-request-transmitting interconnect circuit node, unblock-request-receiving interconnect circuit node, and/or interconnect circuit described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 23:
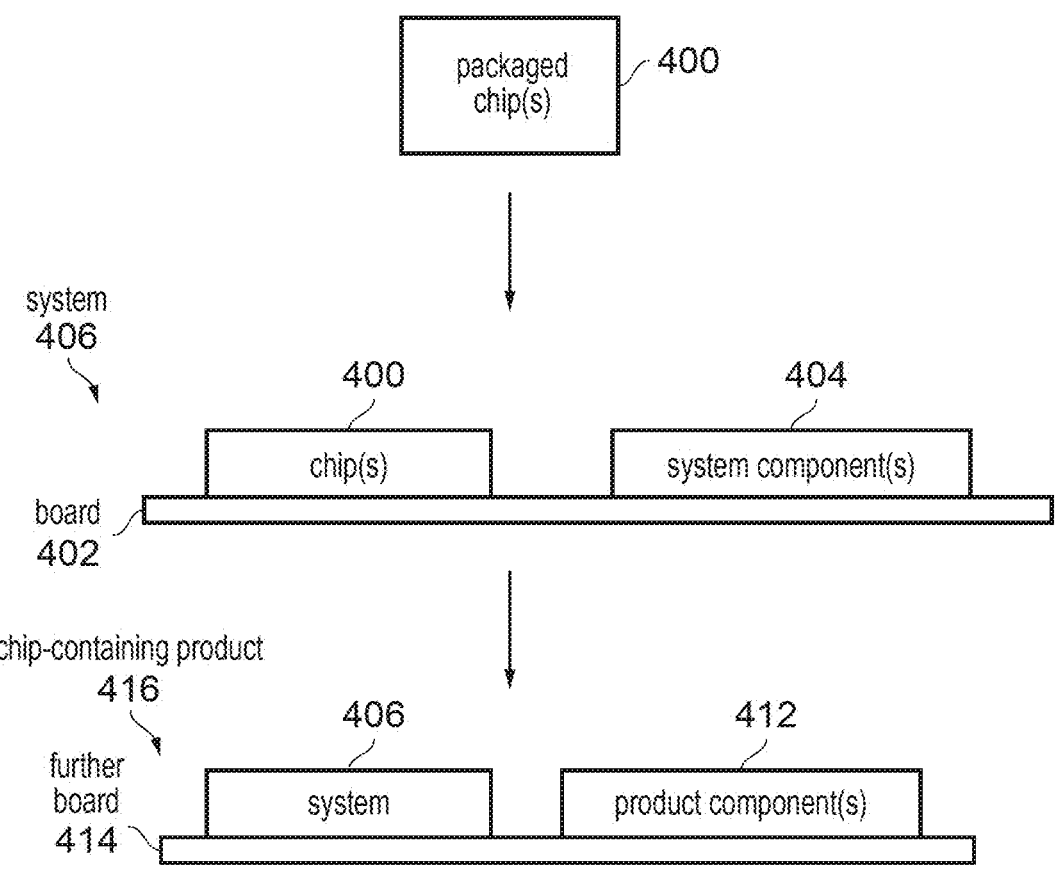
FIG. 23 illustrates a system and a chip-containing product.

As shown in FIG. 23, one or more packaged chips 400, with the unblock-request-transmitting interconnect circuit node, unblock-request-receiving interconnect circuit node, and/or interconnect circuit described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the unblock-request-transmitting interconnect circuit node, unblock-request-receiving interconnect circuit node, and/or interconnect circuit described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL.

Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Some examples are set out in the following clauses:

1. An unblock-request-transmitting interconnect circuit node, comprising:

transmitting interface circuitry configured to transmit outgoing requests based on one or more incoming requests received from at least one request source, each outgoing request specifying a target node to which that outgoing request is to be transmitted; and control circuitry configured to control the transmitting interface circuitry; in which:

in response to at least one incoming write request received from a strong-order-requiring request source requiring transmission of a set of strongly ordered write push requests subject to an ordering requirement preventing a younger request from being observed as completing before an older request, each write push request specifying write target data and write target address information for identifying one or more addressed locations to which the write target data is to be written, and the set of strongly ordered write push requests comprising at least a first write push request which specifies a first target node and a second write push request which is younger than the first write push request and specifies a second target node, the control circuitry is configured to control the transmitting interface circuitry to:

transmit the first write push request specifying the first target node;

prior to a completion response being received from the first target node for the first write push request, transmit the second write push request specifying the second target node; and in response to the completion response being received from the first target node for the first write push request, transmit an unblock request specifying the second target node, the unblock request indicating that an unblocking condition is allowed to become satisfied for the second write push request enabling the second target node or a further node downstream of the second target node to release a block on completion of a conflicting read request which requests a read to one of said one or more addressed locations identified by the write target address information specified by the second write push request.

2. The unblock-request-transmitting interconnect circuit node according to clause 1, in which a given write push request of the set of strongly ordered write push requests specifies unblock type information indicative of whether the give write push request is an explicit unblock type of write push request for which the unblock request is required to be transmitted to enable the unblocking condition to be satisfied for the explicit unblock type of write push request, or an implicit unblock type of write push request for which the unblocking condition is allowed to be satisfied even if no unblock request has been transmitted for the implicit unblock type of write push request.

3. The unblock-request-transmitting interconnect circuit node according to clause 2, in which the control circuitry is configured to control the transmitting interface circuitry to:

transmit the given write push request as the explicit unblock type of write push request, when the given write push request is not an initial write push request of the set of strongly ordered write push requests and specifies a different target node to a target node specified for a preceding write push request of the set of strongly ordered write push requests; and transmit the given write push request as the implicit unblock type for the given write push request, when the given strongly ordered write push request is the initial write push request or specifies a same target node as the preceding strongly ordered write push request of the set.

4. The unblock-request-transmitting interconnect circuit node according to any of clauses 1 to 3, in which the transmitting interface circuitry is configured to transmit the set of strongly ordered write push requests on a communication channel which provides a guarantee that a set of strongly ordered write push requests corresponding to a first strong-order-requiring request source cannot cause blocking of a set of strongly ordered write push requests corresponding to a second strong-order-requiring request source.

5. The unblock-request-transmitting interconnect circuit node according to clause 4, in which the transmitting interface circuitry is configured to allocate the set of strongly ordered write push requests corresponding to the first strong-order-requiring request source to a first resource plane different from a second resource plane allocated for handling the set of strongly ordered write push requests corresponding to the second strong-order-requiring request source, the first resource plane and second resource plane providing separate hardware resources for communication of requests on the communication channel.

6. The unblock-request-transmitting interconnect circuit node according to clause 4, in which the communication channel comprises shared hardware resource shared between the set of strongly ordered write push requests corresponding to the first strong-order-requiring request and the set of strongly ordered write push requests corresponding to the second strong-order-requiring request source; and the transmitting interface circuitry is configured to manage transmission of the set of strongly ordered write push requests corresponding to the first strong-order-requiring request source based on availability of a first type of credit different to a second type of credit used to manage transmission of the set of strongly ordered write push requests corresponding to the second strong-order-requiring request source.

7. The unblock-request-transmitting interconnect circuit node according to any of clauses 1 to 6, in which the strong-order-requiring request source comprises a PCIe source configured to generate the incoming requests based on PCIe transactions received on a PCIe communications link.

8. The unblock-request-transmitting interconnect circuit node according to any of clauses 1 to 7, in which the unblock-request-transmitting interconnect circuit node comprises an ingress interface for an interconnect, the ingress interface comprising protocol conversion circuitry configured to convert between incoming requests defined according to an upstream protocol used by the at least one request source and the outgoing requests defined according to an interconnect transport protocol used by the interconnect.

9. An unblock-request-receiving interconnect circuit node, comprising:

receiving interface circuitry configured to receive a given write push request specifying write target data and write target address information identifying one or more addressed locations to which the write target data is to be written; and read blocking control circuitry configured to enforce a requirement that a conflicting read request, which requests a read to one of the one or more addressed locations identified by the write target address information specified by the write push request, is blocked from completing until an unblocking condition is satisfied for the given write push request, where for at least one type of write push request, satisfaction of the unblocking condition is dependent on an unblock request for the given write push request being received by the receiving interface circuitry.

10. The unblock-request-receiving interconnect circuit node according to clause 9, in which the read blocking control circuitry comprises tracking circuitry configured to maintain one or more tracking entries, each tracking entry configured to track address information corresponding to a given write push request for which the unblocking condition is not yet satisfied; and in response to a given read request received at the receiving interface circuitry, the read blocking control circuitry is configured to determine whether to block completion of the given read request based on a lookup of read target address information of the given read request in the tracking circuitry to determine whether the read target address information corresponds to the address information tracked by a tracking entry for a write push request for which the unblocking condition is not yet satisfied.

11. The unblock-request-receiving interconnect circuit node according to clause 10, in which the given write push request specifies a request source identifier identifying a request source which caused the given write push request to be transmitted to the receiving interface circuitry; and the tracking circuitry is configured to reserve at least one dedicated tracking entry per strong-order-requiring request source, each strong-order-requiring request source comprising a request source capable of causing a transmission of a set of strongly ordered write push requests which are subject to an ordering requirement preventing a younger request from being observed as completing before an older request.

12. The unblock-request-receiving interconnect circuit node according to clause 9, in which the read blocking control circuitry is configured to enforce the requirement for the conflicting read request by delaying a timing of transmitting a write completion acknowledgement for the write push request to a downstream circuit node until the unblocking condition is satisfied for the write push request, the write completion acknowledgement indicating that the downstream circuit node is allowed to release a block on completion of the conflicting read request.

13. The unblock-request-receiving interconnect circuit node according to any of clauses 9 to 12, in which the given write push request specifies unblock type information indicative of whether the give write push request is an explicit unblock type of write push request for which the unblock request is required to be received to enable the unblocking condition to be satisfied for the explicit unblock type of write push request, or an implicit unblock type of write push request for which the unblocking condition is allowed to be satisfied even if no unblock request has been received for the implicit unblock type of write push request.

14. The unblock-request-receiving interconnect circuit node according to clause 13, in which, when the given write push request is the explicit unblock type of write push request, satisfaction of the unblocking condition is dependent on each of the following conditions being satisfied:

the unblock request has been received for the given write push request;

a write completion response has been received for the given write push request; and the unblocking condition is satisfied for any older write push request of a set of strongly ordered write push requests comprising the given write push request.

15. The unblock-request-receiving interconnect circuit node according to any of clauses 13 and 14, in which, when the given write push request is the implicit unblock type of write push request, satisfaction of the unblocking condition is dependent on each of the following conditions being satisfied, independent of whether any unblock request has been received for the given write push request:

a write completion response has been received for the given write push request; and when the given write push request is one of a set of strongly ordered write push requests, the unblocking condition is satisfied for any older write push request of the set of strongly ordered write push requests.

16. The unblock-request-receiving interconnect circuit node according to any of clauses 9 to 15, in which the receiving interface circuitry is configured to receive the given write push request on a communication channel which provides a guarantee that a set of strongly ordered write push requests corresponding to a first strong-order-requiring request source cannot cause blocking of a set of strongly ordered write push requests corresponding to a second strong-order-requiring request source.

17. The unblock-request-receiving interconnect circuit node according to clause 16, in which the guarantee is provided by use of separate resource planes providing separate hardware resources for communication of requests from the first strong-order-requiring request source and the second strong-order-requiring request source respectively.

18. The unblock-request-receiving interconnect circuit node according to clause 16, in which the communication channel comprises shared hardware resource shared between the set of strongly ordered write push requests corresponding to the first strong-order-requiring request and the set of strongly ordered write push requests corresponding to the second strong-order-requiring request source; and the receiving interface circuitry is configured to manage reception of the set of strongly ordered write push requests corresponding to the first strong-order-requiring request source based on signalling to an upstream circuit node availability of a first type of credit, and manage reception of the set of strongly ordered write push requests corresponding to the second strong-order-requiring request source based on signalling to an upstream circuit node availability of a second type of credit.

19. The unblock-request-receiving interconnect circuit node according to any of clauses 9 to 18, in which the unblock-request-receiving interconnect circuit node comprises an egress interface for an interconnect, the egress interface comprising protocol conversion circuitry configured to convert between incoming requests defined according to an interconnect transport protocol used by the interconnect and outgoing requests defined according to a downstream protocol used by a downstream circuit node.

20. An interconnect circuit comprising:

an unblock-request-receiving interconnect circuit node configured to receive a given write push request specifying write target data and write target address information identifying one or more addressed locations to which the write target data is to be written, and to enforce a requirement that a conflicting read request, which requests a read to one of the one or more addressed locations identified by the write target address information specified by the write push request, is blocked from completing until an unblocking condition is satisfied for the given write push request, where for at least one type of write push request, satisfaction of the unblocking condition is dependent on an unblock request for the given write push request being received by the unblock-request-receiving interconnect circuit node; and an unblock-request-transmitting interconnect circuit node configured to transmit the given write push request to the unblock-request-receiving interconnect circuit node, and to transmit the unblock request for the given write push request in response to receipt of a completion response for an older write push request transmitted by the unblock-request-transmitting interconnect circuit node.

21. A system comprising:

the interconnect circuit according to clause 20, implemented in at least one packaged chip;

at least one system component; and a board, wherein the at least one packaged chip and the at least one system component are assembled on the board.

22. A chip-containing product comprising the system of clause 21, wherein the system is assembled on a further board with at least one other product component.

23. A non-transitory computer-readable medium storing computer-readable code for fabrication of the unblock-request-transmitting interconnect circuit node of any of clauses 1 to 8 or the unblock-request-receiving interconnect circuit node of any of clauses 9 to 19.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: A, B and C" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An unblock-request-transmitting interconnect circuit node, comprising:

transmitting interface circuitry configured to transmit outgoing requests based on one or more incoming requests received from at least one request source, each outgoing request specifying a target node to which that outgoing request is to be transmitted; and control circuitry configured to control the transmitting interface circuitry; in which:

in response to at least one incoming write request received from a strong-order-requiring request source requiring transmission of a set of strongly ordered write push requests subject to an ordering requirement preventing a younger request from being observed as completing before an older request, each write push request specifying write target data and write target address information for identifying one or more addressed locations to which the write target data is to be written, and the set of strongly ordered write push requests comprising at least a first write push request which specifies a first target node and a second write push request which is younger than the first write push request and specifies a second target node, the control circuitry is configured to control the transmitting interface circuitry to:

transmit the first write push request specifying the first target node;

prior to a completion response being received from the first target node for the first write push request, transmit the second write push request specifying the second target node; and in response to the completion response being received from the first target node for the first write push request, transmit an unblock request specifying the second target node, the unblock request indicating that an unblocking condition is allowed to become satisfied for the second write push request enabling the second target node or a further node downstream of the second target node to release a block on completion of a conflicting read request which requests a read to one of said one or more addressed locations identified by the write target address information specified by the second write push request.

2. The unblock-request-transmitting interconnect circuit node according to claim 1, in which a given write push request of the set of strongly ordered write push requests specifies unblock type information indicative of whether the give write push request is an explicit unblock type of write push request for which the unblock request is required to be transmitted to enable the unblocking condition to be satisfied for the explicit unblock type of write push request, or an implicit unblock type of write push request for which the unblocking condition is allowed to be satisfied even if no unblock request has been transmitted for the implicit unblock type of write push request.

3. The unblock-request-transmitting interconnect circuit node according to claim 2, in which the control circuitry is configured to control the transmitting interface circuitry to:

transmit the given write push request as the explicit unblock type of write push request, when the given write push request is not an initial write push request of the set of strongly ordered write push requests and specifies a different target node to a target node specified for a preceding write push request of the set of strongly ordered write push requests; and transmit the given write push request as the implicit unblock type for the given write push request, when the given strongly ordered write push request is the initial write push request or specifies a same target node as the preceding strongly ordered write push request of the set.

4. The unblock-request-transmitting interconnect circuit node according to claim 1, in which the transmitting interface circuitry is configured to transmit the set of strongly ordered write push requests on a communication channel which provides a guarantee that a set of strongly ordered write push requests corresponding to a first strong-order-requiring request source cannot cause blocking of a set of strongly ordered write push requests corresponding to a second strong-order-requiring request source.

5. The unblock-request-transmitting interconnect circuit node according to claim 4, in which the transmitting interface circuitry is configured to allocate the set of strongly ordered write push requests corresponding to the first strong-order-requiring request source to a first resource plane different from a second resource plane allocated for handling the set of strongly ordered write push requests corresponding to the second strong-order-requiring request source, the first resource plane and second resource plane providing separate hardware resources for communication of requests on the communication channel.

6. The unblock-request-transmitting interconnect circuit node according to claim 4, in which the communication channel comprises shared hardware resource shared between the set of strongly ordered write push requests corresponding to the first strong-order-requiring request and the set of strongly ordered write push requests corresponding to the second strong-order-requiring request source; and the transmitting interface circuitry is configured to manage transmission of the set of strongly ordered write push requests corresponding to the first strong-order-requiring request source based on availability of a first type of credit different to a second type of credit used to manage transmission of the set of strongly ordered write push requests corresponding to the second strong-order-requiring request source.

7. The unblock-request-transmitting interconnect circuit node according to claim 1, in which the strong-order-requiring request source comprises a PCIe source configured to generate the incoming requests based on PCIe transactions received on a PCIe communications link.

8. The unblock-request-transmitting interconnect circuit node according to claim 1, in which the unblock-request-transmitting interconnect circuit node comprises an ingress interface for an interconnect, the ingress interface comprising protocol conversion circuitry configured to convert between incoming requests defined according to an upstream protocol used by the at least one request source and the outgoing requests defined according to an interconnect transport protocol used by the interconnect.

9. An unblock-request-receiving interconnect circuit node, comprising:

receiving interface circuitry configured to receive a given write push request specifying write target data and write target address information identifying one or more addressed locations to which the write target data is to be written; and read blocking control circuitry configured to enforce a requirement that a conflicting read request, which requests a read to one of the one or more addressed locations identified by the write target address information specified by the given write push request, is blocked from completing until an unblocking condition is satisfied for the given write push request, where for at least one type of write push request, satisfaction of the unblocking condition is dependent on an unblock request for the given write push request being received by the receiving interface circuitry.

10. The unblock-request-receiving interconnect circuit node according to claim 9, in which the read blocking control circuitry comprises tracking circuitry configured to maintain one or more tracking entries, each tracking entry configured to track address information corresponding to a given write push request for which the unblocking condition is not yet satisfied; and in response to a given read request received at the receiving interface circuitry, the read blocking control circuitry is configured to determine whether to block completion of the given read request based on a lookup of read target address information of the given read request in the tracking circuitry to determine whether the read target address information corresponds to the address information tracked by a tracking entry for a write push request for which the unblocking condition is not yet satisfied.

11. The unblock-request-receiving interconnect circuit node according to claim 10, in which the given write push request specifies a request source identifier identifying a request source which caused the given write push request to be transmitted to the receiving interface circuitry; and the tracking circuitry is configured to reserve at least one dedicated tracking entry per strong-order-requiring request source, each strong-order-requiring request source comprising a request source capable of causing a transmission of a set of strongly ordered write push requests which are subject to an ordering requirement preventing a younger request from being observed as completing before an older request.

12. The unblock-request-receiving interconnect circuit node according to claim 9, in which the read blocking control circuitry is configured to enforce the requirement for the conflicting read request by delaying a timing of transmitting a write completion acknowledgement for the write push request to a downstream circuit node until the unblocking condition is satisfied for the write push request, the write completion acknowledgement indicating that the downstream circuit node is allowed to release a block on completion of the conflicting read request.

13. The unblock-request-receiving interconnect circuit node according to claim 9, in which the given write push request specifies unblock type information indicative of whether the give write push request is an explicit unblock type of write push request for which the unblock request is required to be received to enable the unblocking condition to be satisfied for the explicit unblock type of write push request, or an implicit unblock type of write push request for which the unblocking condition is allowed to be satisfied even if no unblock request has been received for the implicit unblock type of write push request.

14. The unblock-request-receiving interconnect circuit node according to claim 13, in which, when the given write push request is the explicit unblock type of write push request, satisfaction of the unblocking condition is dependent on each of the following conditions being satisfied:

the unblock request has been received for the given write push request;

a write completion response has been received for the given write push request; and the unblocking condition is satisfied for any older write push request of a set of strongly ordered write push requests comprising the given write push request.

15. The unblock-request-receiving interconnect circuit node according to claim 13, in which, when the given write push request is the implicit unblock type of write push request, satisfaction of the unblocking condition is dependent on each of the following conditions being satisfied, independent of whether any unblock request has been received for the given write push request:

a write completion response has been received for the given write push request; and when the given write push request is one of a set of strongly ordered write push requests, the unblocking condition is satisfied for any older write push request of the set of strongly ordered write push requests.

16. The unblock-request-receiving interconnect circuit node according to claim 9, in which the unblock-requestreceiving interconnect circuit node comprises an egress interface for an interconnect, the egress interface comprising protocol conversion circuitry configured to convert between incoming requests defined according to an interconnect transport protocol used by the interconnect and outgoing requests defined according to a downstream protocol used by a downstream circuit node.

17. An interconnect circuit comprising:

an unblock-request-receiving interconnect circuit node configured to receive a given write push request specifying write target data and write target address information identifying one or more addressed locations to which the write target data is to be written, and to enforce a requirement that a conflicting read request, which requests a read to one of the one or more addressed locations identified by the write target address information specified by the given write push request, is blocked from completing until an unblocking condition is satisfied for the given write push request, where for at least one type of write push request, satisfaction of the unblocking condition is dependent on an unblock request for the given write push request being received by the unblock-request-receiving interconnect circuit node; and an unblock-request-transmitting interconnect circuit node configured to transmit the given write push request to the unblock-request-receiving interconnect circuit node, and to transmit the unblock request for the given write push request in response to receipt of a completion response for an older write push request transmitted by the unblock-request-transmitting interconnect circuit node.

18. A system comprising:

the interconnect circuit according to claim 17, implemented in at least one packaged chip;

at least one system component; and a board, wherein the at least one packaged chip and the at least one system component are assembled on the board.

19. A chip-containing product comprising the system of claim 18, wherein the system is assembled on a further board with at least one other product component.

20. A non-transitory computer-readable medium storing computer-readable code for fabrication of the unblock-request-transmitting interconnect circuit node of claim 1.

* * * * *